(12) United States Patent
Uchimura et al.

(10) Patent No.: US 6,937,842 B2
(45) Date of Patent: Aug. 30, 2005

(54) LEARNING SUPPORT MESSAGE DISTRIBUTION PROGRAM

(75) Inventors: Kazuko Uchimura, Ishikawa (JP); Kinya Hayashi, 12-1, Oshino 2-chome, Nonoichi-cho, Ishikawa-gun, Ishikawa pref., Ishikawa (JP), 921-8802; Kouichi Imamura, Ishikawa (JP)

(73) Assignees: Pastel Labo. Co., Ltd., Ishikawa Pref (JP); Kinya Hayashi, Ishikawa Pref (JP)

( * ) Notice: Subject to any disclaimer, the term of this patent is extended or adjusted under 35 U.S.C. 154(b) by 374 days.

(21) Appl. No.: 10/277,014

(22) Filed: Oct. 21, 2002

(65) Prior Publication Data
US 2003/0087224 A1 May 8, 2003

(30) Foreign Application Priority Data
Nov. 8, 2001 (JP) .................................... 2001-343308

(51) Int. Cl.$^7$ ............................................... G09B 3/00
(52) U.S. Cl. ...................... 434/350; 434/118; 434/362; 709/204; 709/218; 725/78
(58) Field of Search ............................... 434/118, 322, 434/323, 350, 362, 365; 709/204, 206, 218, 224; 725/78; 715/500, 784; 379/100.03; 705/3; 706/11, 927

(56) References Cited

U.S. PATENT DOCUMENTS

| | | | | |
|---|---|---|---|---|
| 5,719,924 A | * | 2/1998 | Haneda et al. ......... 379/100.03 |
| 5,737,539 A | * | 4/1998 | Edelson et al. ................. 705/3 |
| 5,974,446 A | * | 10/1999 | Sonnenreich et al. ....... 709/204 |
| 5,987,443 A | * | 11/1999 | Nichols et al. ............... 706/11 |
| 5,999,908 A | * | 12/1999 | Abelow .......................... 705/1 |
| 6,018,768 A | * | 1/2000 | Ullman et al. .............. 709/218 |
| 6,105,046 A | * | 8/2000 | Greenfield et al. ......... 715/530 |
| 6,161,130 A | * | 12/2000 | Horvitz et al. .............. 709/206 |
| 6,341,960 B1 | * | 1/2002 | Frasson et al. ............. 434/322 |
| 6,364,667 B1 | * | 4/2002 | Heinberg et al. ........... 434/322 |
| 6,385,627 B1 | * | 5/2002 | Cragun ........................ 715/500 |
| 6,421,709 B1 | * | 7/2002 | McCormick et al. ....... 709/206 |
| 6,471,521 B1 | * | 10/2002 | Dornbush et al. .......... 434/322 |
| 6,493,703 B1 | * | 12/2002 | Knight et al. .................. 707/3 |
| 6,753,889 B1 | * | 6/2004 | Najmi ........................ 715/784 |
| 6,801,751 B1 | * | 10/2004 | Wood et al. ................ 434/362 |
| 6,857,012 B2 | * | 2/2005 | Sim et al. ................... 709/222 |
| 2001/0031456 A1 | * | 10/2001 | Cynaumon et al. ......... 434/350 |
| 2002/0138841 A1 | * | 9/2002 | Ward ............................ 725/78 |
| 2003/0061187 A1 | * | 3/2003 | Fukui et al. ................. 706/45 |
| 2004/0039814 A1 | * | 2/2004 | Crabtree et al. ............ 709/224 |
| 2004/0219493 A1 | * | 11/2004 | Phillips ...................... 434/118 |

FOREIGN PATENT DOCUMENTS

| | | |
|---|---|---|
| JP | 09-016065 | 1/1997 |
| JP | 2001-282089 | 10/2001 |

* cited by examiner

*Primary Examiner*—Joe H. Cheng
(74) *Attorney, Agent, or Firm*—King & Schickli, PLLC

(57) ABSTRACT

Disclosed is a learning support message distribution program which analyzes learning information of a learner, prepares a support message having contents based on the result of the analysis and distributes the support message to a supporter unit in place of a supporter of the learner. Learning progress levels on a current distribution date and a previous distribution date are read out and a learning-progress status level value is determined by referring to a learning-progress status level determination table. A current short-term grade level and a previous short-term grade level are read out and a short-term grade level value is determined by referring to a test-result status level determination table. A current cumulative grade level and a previous cumulative grade level are read out, a cumulative grade level value is determined by referring to the test-result status level determination table and a support mail editing/sending routine is executed. The support mail editing/sending routine sends a support message in which a proposed advice sentence corresponding to each status level value is written to a supporter personal computer.

2 Claims, 16 Drawing Sheets

FIG. 2A

26d: LEARNING-PROGRESS MANAGEMENT MEMORY

| 26d1 | 26d2 | 26d3 | 26d4 | 26d5 | 26d6 | 26d7 | 26d8 |
|---|---|---|---|---|---|---|---|
| LOGIN NAME AREA | ACCESS NUMBER AREA | COURSE CODE AREA | SECTION NUMBER AREA | LEARNING START DATE AREA | LEARNING END DATE AREA | TOTAL LEARNING TIME AREA | PAGES-AT-END-OF-LEARNING AREA |
| AAA01 | 1 | 0001 | 1 | 2000/7/1 9:00 | 2000/7/1 10:30 | 1'30 | 7 |
| | 2 | 0001 | 2 | 2000/7/5 11:30 | 2000/7/5 13:00 | 3'00 | 12 |
| | 3 | 0001 | 2 | 2000/7/8 8:00 | 2000/7/8 9:00 | 4'00 | 15 |
| | 4 | 0001 | 2 | 2000/7/11 7:30 | 2000/7/11 9:00 | 5'30 | 20 |
| | 5 | 0001 | 3 | 2000/7/13 19:30 | 2000/7/13 21:00 | 7'00 | 25 |
| | 6 | 0001 | 3 | 2000/7/16 7:30 | 2000/7/16 9:00 | 8'30 | 30 |
| | 7 | 0001 | 3 | 2000/7/19 15:30 | 2000/7/19 17:00 | 10'00 | 35 |
| | 8 | 0001 | 3 | 2000/7/22 3:30 | 2000/7/22 5:00 | 11'30 | 40 |
| | 9 | 0001 | 4 | 2000/7/26 7:30 | 2000/7/26 9:00 | 13'00 | 47 |
| | 10 | 0001 | 4 | 2000/7/29 12:30 | 2000/7/29 13:00 | 13'30 | 49 |
| | 11 | 0001 | 4 | 2000/8/11 4:00 | 2000/8/11 5:00 | 14'30 | 52 |
| | 12 | 0001 | 5 | 2000/8/16 4:00 | 2000/8/16 5:00 | 15'30 | 55 |
| | 13 | 0001 | 5 | 2000/8/20 7:30 | 2000/8/20 9:00 | 17'00 | 60 |
| | 14 | 0001 | 5 | 2000/8/23 16:00 | 2000/8/23 17:00 | 18'00 | 62 |
| | 15 | 0001 | 5 | 2000/8/28 15:30 | 2000/8/28 17:00 | 19'30 | 67 |
| | 16 | 0001 | 6 | 2000/9/1 19:00 | 2000/9/1 21:00 | 21'30 | 75 |
| | : | : | : | : | : | : | : |

FIG. 2B

26e: TEST-RESULT MANAGEMENT MEMORY

| 26e1 | 26e2 | 26e3 | 26e4 | 26e5 | 26e6 |
|---|---|---|---|---|---|
| LOGIN NAME AREA | ACCESS NUMBER AREA | COURSE CODE AREA | SECTION NUMBER AREA | CORRECT-ANSWER SCORE AREA | PERFECT SCORE AREA |
| AAA01 | 2 | 0001 | 1 | 70 | 100 |
| | 5 | 0001 | 2 | 85 | 100 |
| | 9 | 0001 | 3 | 90 | 100 |
| | 12 | 0001 | 4 | 73 | 100 |
| | 16 | 0001 | 5 | 81 | 100 |
| | 17 | 0001 | 6 | 95 | 100 |
| | : | : | : | : | : |

FIG. 4A

36c: LEARNING-PROGRESS ANALYSIS REFERENCE DATA MEMORY

| COURSE CODE AREA (36c1) | SECTION NUMBER AREA (36c2) | NUMBER-OF-PAGES AREA (36c3) | STANDARD LEARNING TIME AREA (36c4) | STANDARD-LEARNING-TIME-FOR-ONE-PAGE AREA (36c5) | TARGET-ACHIEVEMENT-TIME AREA (36c6) |
|---|---|---|---|---|---|
| 0001 | 1 | 10 | 2'00 | 0'12 | 168'00 |
| 0001 | 2 | 15 | 4'00 | 0'16 | 480'00 |
| 0001 | 3 | 20 | 2'00 | 0'09 | 672'00 |
| 0001 | 4 | 10 | 2'00 | 0'12 | 888'00 |
| 0001 | 5 | 15 | 4'00 | 0'16 | 1200'00 |
| 0001 | 6 | 10 | 2'00 | 0'12 | 1512'00 |
| 0001 | 7 | 15 | 6'00 | 0'24 | 1896'00 |
| 0001 | 8 | 10 | 2'00 | 0'12 | 2160'00 |

FIG. 4B

36d: TEST-RESULT ANALYSIS REFERENCE DATA MEMORY

| COURSE CODE AREA (36d1) | STANDARD TARGET SCORE AREA (36d2) |
|---|---|
| 0001 | 0.80 |
| 0002 | 0.90 |
| 0003 | 0.70 |
| 0004 | 0.85 |
| 0005 | 0.75 |
| 0006 | 0.80 |

FIG. 4C

36e: LEARNING-PROGRESS LEVEL CONVERSION TABLE

| LEARNING PROGRESS LEVEL AREA (36e1) | PREVIOUS SECTION ACHIEVEMENT POINT REFERENCE AREA (36e2) | CURRENT SECTION ACHIEVEMENT POINT REFERENCE AREA (36e3) |
|---|---|---|
| b1 | 0.0~0.5 | — |
| b2 | 0.5~1.0 | 0.0~0.5 |
| b3 | 1.0~ | 0.5~1.0 |
| b4 | — | 1.0~1.5 |
| b5 | — | 1.5~2.0 |
| b6 | — | 2.0~ |

FIG. 4D

36f: TEST-RESULT LEVEL CONVERSION TABLE

| GRADE LEVEL AREA (36f1) | GRADE POINT REFERENCE AREA (36f2) |
|---|---|
| c1 | 0.0~0.5 |
| c2 | 0.5~0.7 |
| c3 | 0.7~0.9 |
| c4 | 0.9~1.0 |
| c5 | 1.0~1.25 |
| c6 | 1.25~ |

FIG. 5

36g : ACTION DATA MEMORY

| LOGIN NAME AREA 36g1 | DISTRIBUTION DATE AREA 36g2 | PREVIOUS SECTION ACHIEVEMENT POINT AREA 36g3 | CURRENT SECTION ACHIEVEMENT POINT AREA 36g4 | SHORT-TERM GRADE POINT AREA 36g5 | CUMULATIVE GRADE POINT AREA 36g6 | LEARNING PROGRESS LEVEL AREA 36g7 | SHORT-TERM GRADE LEVEL AREA 36g8 | CUMULATIVE GRADE LEVEL AREA 36g9 |
|---|---|---|---|---|---|---|---|---|
| AAA01 | 2000/7/8 9:00 | 1.000 | 0.350 | 0.875 | 0.875 | b2 | c3 | c3 |
| | 2000/7/15 9:00 | 0.700 | 0.500 | 1.063 | 0.969 | b2 | c5 | c4 |
| | 2000/7/22 9:00 | 1.050 | 0.750 | - | - | b3 | - | - |
| | 2000/7/29 9:00 | 1.000 | 0.757 | 1.125 | 1.021 | b3 | c5 | c5 |
| | 2000/8/5 9:00 | 1.250 | 0.946 | - | - | b4 | - | - |
| | 2000/8/12 9:00 | 1.500 | 1.140 | - | - | b3 | c4 | c4 |
| | 2000/8/19 9:00 | 1.320 | 0.980 | 0.913 | 0.994 | b4 | - | - |
| | 2000/8/26 9:00 | 1.510 | 1.120 | - | 0.998 | b4 | c5 | c4 |
| | 2000/9/2 9:00 | 1.260 | 1.000 | 1.025 | 1.029 | b3 | c5 | c5 |
| | 2000/9/9 9:00 | 1.110 | 0.886 | 1.190 | | | | |
| | ... | ... | ... | ... | ... | ... | ... | ... |

FIG. 6A

36h : LEARNING-PROGRESS STATUS LEVEL DETERMINATION TABLE

| PREVIOUS LEARNING PROGRESS LEVEL / CURRENT LEARNING PROGRESS LEVEL | b1 | b2 | b3 | b4 | b5 | b6 |
|---|---|---|---|---|---|---|
| b1 | 0 | -1 | -2 | -3 | -4 | -5 |
| b2 | 1 | 0 | -1 | -2 | -3 | -4 |
| b3 | 2 | 1 | 0 | -1 | -2 | -3 |
| b4 | 3 | 2 | 1 | 0 | -1 | -2 |
| b5 | 4 | 3 | 2 | 1 | 0 | -1 |
| b6 | 5 | 4 | 3 | 2 | 1 | 0 |

FIG. 6B

36i : TEST-RESULT STATUS LEVEL DETERMINATION TABLE

| PREVIOUS GRADE LEVEL / CURRENT GRADE LEVEL | c1 | c2 | c3 | c4 | c5 | c6 |
|---|---|---|---|---|---|---|
| c1 | 0 | -1 | -2 | -3 | -4 | -5 |
| c2 | 1 | 0 | -1 | -2 | -3 | -4 |
| c3 | 2 | 1 | 0 | -1 | -2 | -3 |
| c4 | 3 | 2 | 1 | 0 | -1 | -2 |
| c5 | 4 | 3 | 2 | 1 | 0 | -1 |
| c6 | 5 | 4 | 3 | 2 | 1 | 0 |

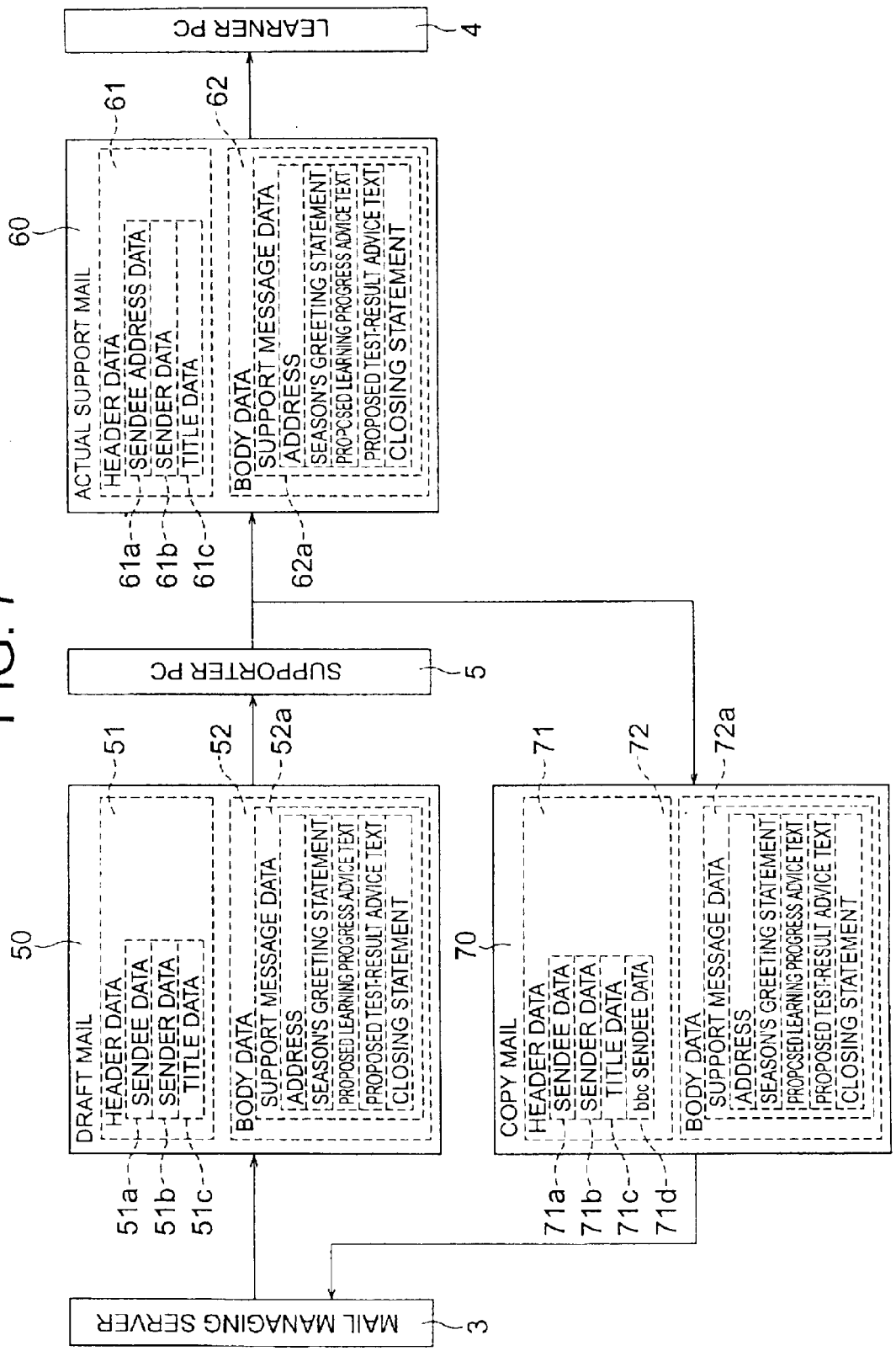

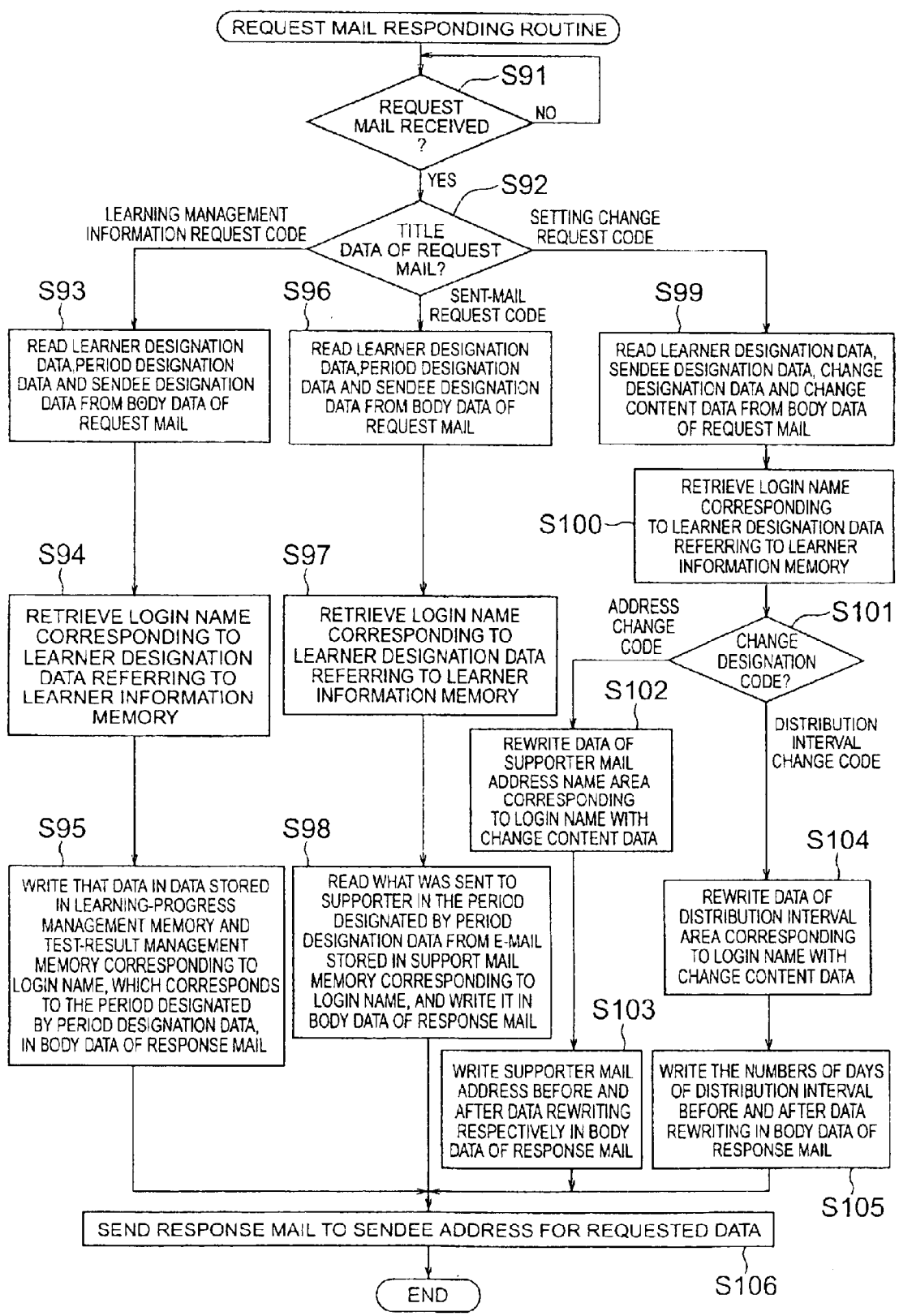

LEARNING SUPPORT MESSAGE DISTRIBUTION PROGRAM

This application claims priority to Japanese Patent application No. 2001-343308, filed Nov. 8, 2001.

TECHNICAL FIELD

The present invention relates to a learning support message distribution program which analyzes learning information of a learner, prepares a support message having contents according to the learning situation of a learner and distributes the message to a supporter unit in place of a supporter of the learner.

BACKGROUND OF THE INVENTION

Remote learning systems which provide learners with educational services are equipped with functions of storing lecture contents and test questions placed on a web site which provides information of a hypertext type and transmitting the web site that contains the lecture contents and test questions to a learner personal computer (hereinafter called "PC") used by each learner through network communication net such as an internet network. The educational services of such a remote learning system allow each learner to receive a web site containing lecture contents and test questions and study using the learner's PC whenever it is convenient for the learner, thus eliminating restrictions on study times.

Because the remote learning system directly transmits and receives a web site that contains lecture contents and test questions to and from learner PCs, it is possible to manage the learning situations, such as the learning progress and test results, based on history data on the transmission and reception. Further, the remote learning system is equipped with a manager PC which is used by the manager of the system (e.g., a lecturer who instructs learning curricula) and is capable of transmitting and receiving e-mail between the manager PC and learner PCs. Questions and answers between a learner and the manager can therefore be made by means of e-mail which is transmitted and received between the manager PC and learner PCs. This can allow the manager to make faster responses to questions made by learners as compared with questions and answers made by means of ordinary mail as done in correspondence courses.

Generally speaking, however, in case where a learner studies using the remote learning system, a supporter, who may be a superior in a company or a parent, is informed of learning information, such as a learner's learning progress and test results, by mail which is sent within a period of about three months after the end of a learning course. When a learner is taking a learning course, therefore, the supporter of the learner cannot know the details of learning information of the learner without asking the learner or the system manager about learning information on the learner.

Unless a supporter can grasp the learning situation of a learner in detail, therefore, the supporter cannot make detailed communication with the learner about the learning situation. Therefore, the supporter is likely to lose a chance to have friendly communication with the learner, including messages on praising the learner's achievement of the learning goal, encouragement and spurring, which will be disincentive to the learner.

As a solution to the problem, the remote learning system may be able to regularly transmit learning information to a supporter PC which is used by the supporter. In this case, however, the supporter should analyze the learning information himself or herself. The transmission of such learning information, when huge, particularly, would impose a severe burden on the supporter. This inhibits the supporter from giving adequate pieces of advice according to the learning situation to the learner, which may eventually make the learner give up the study.

SUMMARY OF THE INVENTION

Accordingly, it is an objective of the invention to provide a learning support message distribution program which analyzes learning information of a learner, prepares a support message having contents based on the result of the analysis and distributes the support message to a supporter unit in place of a supporter of the learner.

To achieve the object, according to the invention, there is provided a learning support message distribution program allowing a computer having learning information memory means for storing learning information of a learner and address memory means, connected to a supporter unit to be used by a supporter of the learner, for storing sendee address for communication data to the supporter unit to function as learning information reading means for reading learning information from the learning information memory means; analysis data memory means for storing analysis data for analyzing the learning information read from the learning information reading means; analysis means for analyzing the learning information read by the learning information reading means based on the analysis data stored in the analysis data memory means; analysis result data memory means for storing the analysis result data obtained by the analysis means; learning situation determining means for determining a change in a learning situation by comparing old analysis result data stored in the analysis result data memory means with current analysis result data obtained by the analysis means; message memory means for storing a support message whose contents correspond to a result of determination made by the learning situation determining means; message reading means for reading the support message corresponding to the result of determination made by the learning situation determining means from the message memory means; and message transmitting means for transmitting the support message read by the message reading means to the sendee address stored in the address memory means.

The learning support message distribution program performs the following operations in cooperation with a computer. First, the learning information reading means reads learning information, which is then analyzed by the analysis means based on the analysis data stored in the analysis data memory means. The learning situation determining means compares data on the results of analysis of the learning information with old analysis result data stored in the analysis result data memory means and determines a change in the learning situation of the learner. After the determination, the message reading means reads out the support message whose contents correspond to the result of the determination made by the learning situation determining means from the message memory means, and the message transmitting means transmits the support message to the sendee address stored in the address memory means, i.e., the supporter unit that is used by the supporter of the learner.

The learning support message distribution program may further allow the computer to function as clock means for measuring time; time interval memory means for storing information on a time interval from information readout performed by the learning information reading means to next information readout; time passage determining means for determining a passage of the time interval stored in the time interval memory means based on the time measured by the clock means; and learning information readout executing means for causing the learning information reading means to execute a readout process when the time passage determining means determines that the time interval stored in the time interval memory means has passed.

In addition to the operations of the learning support message distribution program, the preferable learning support message distribution program has a capability such that the learning information readout executing means causes the learning information reading means to read out learning information from the learning information memory means when the time passage determining means determines that the time interval stored in the time interval memory means has passed, based on time measured by the clock means.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2A is a conceptual diagram of a learning-progress management memory;

FIG. 2B is a conceptual diagram of a test-result management memory;

FIG. 4A is a conceptual diagram of a learning-progress analysis reference data memory;

FIG. 4B is a conceptual diagram of a test-result analysis reference data memory;

FIG. 4C is a conceptual diagram of a learning-progress level conversion table;

FIG. 4D is a conceptual diagram of a test-result level conversion table;

FIG. 5 is a conceptual diagram of an action data memory;

FIG. 6A is a conceptual diagram of a learning-progress status level determination table;

FIG. 6B is a conceptual diagram of a test-result status level determination table;

FIG. 7 is a conceptual diagram of a support mail transmitting/receiving routine;

FIG. 16 is a flowchart illustrating a request mail responding routine.

DETAILED DESCRIPTION OF THE PREFERRED EMBODIMENT

A preferred embodiment of the invention will now be described referring to the accompanying drawings. The following description of the embodiment will be given of a case where a mail managing program 36a is used as one form of a learning support message distribution program and a mail managing server 3 is used as one form of a learning support message distribution system.

Figure 1A:
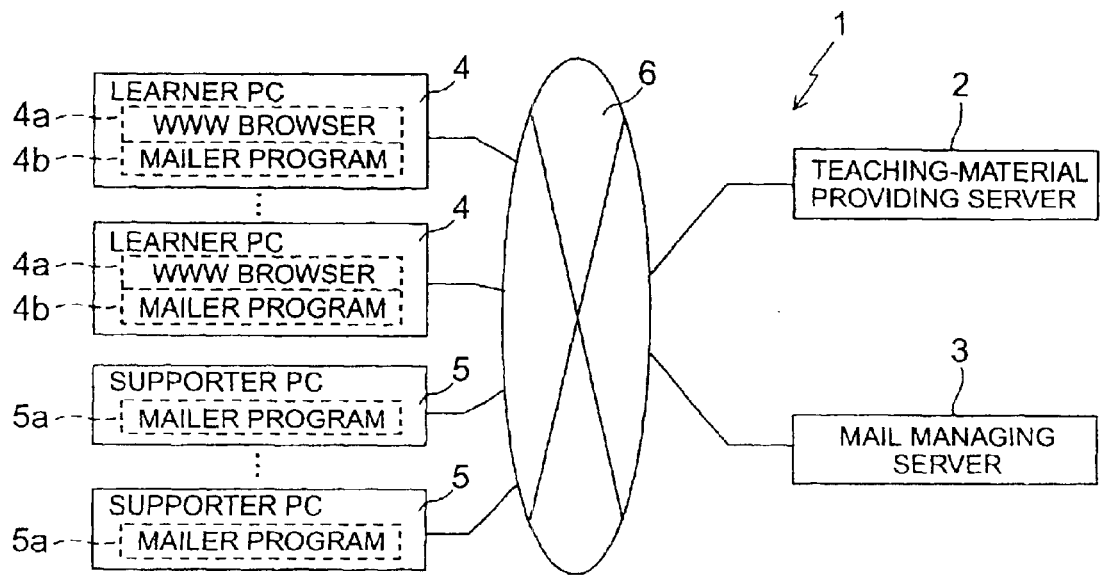
FIG. 1A is a block diagram of a remote learning network system equipped with a mail managing server which is one embodiment of the invention.

FIG. 1A is a block diagram of a remote learning network system 1 equipped with the mail managing server 3 which is one embodiment of the invention. As shown in FIG. 1A, the remote learning network system 1 mainly comprises a teaching-material providing server 2, the mail managing server 3, a plurality of learner PCs 4, 4, . . . , a plurality of supporter PCs 5, 5, . . . , and Internet 6. As a computer which is used by a manager who manages the network system 1 is connected to the Internet 6, various kinds of routines shown in FIGS. 8 to 14 and 16 can be performed on the computer used by the manager. The Internet 6 includes an Intranet.

The teaching-material providing server 2 is a computer system which provides each learner with teaching materials (lecture page and test question page which will be discussed later) via the Internet 6. The teaching-material providing server 2 may be constituted by a computer, such as a personal computer (hereinafter called "PC") or a workstation. The details of the teaching-material providing server 2 will be given later.

The mail managing server 3 is constituted by, for example, a computer, such as a PC or a workstation. Specifically, the mail managing server 3 is a computer having a function of preparing a proposed support message (message including various comments or advice) addressed to a learner who studies using teaching materials provided from the teaching-material providing server 2 in place of a supporter of the learner and a function of sending (distributing) the proposed support message by e-mail (hereinafter simply called "support mail") to the supporter and those functions are realized by executing the mail managing program 36a to be discussed later. The details of the mail managing server 3 will be given later.

"Learners" here include, for example, infants, elementary school children, junior high school students, high school students, students preparing for qualifying examinations, students attending universities, preparatory schools or vocational schools, and persons who are working for companies. "Supporters" are persons who support learners mentally and mean, for example, parents of the learners or superiors thereof.

The learner PC 4 is a PC used by a learner and is installed with a World Wide Web (WWW) browser program (hereinafter simply called "browser") 4a for browsing teaching materials from the teaching-material providing server 2.

The WWW browser 4a is a program which analyzes file data of teaching materials received from the teaching-material providing server 2, displays the teaching materials as a lecture page and test question page on the display of the learner PC 4 and transmits other various pieces of communication data to the teaching-material providing server 2. The learner PC 4 is installed with a mailer program 4b which creates e-mail, sends and receives email and manages e-mail transmission and reception. The mailer program 4b can receive an actual support mail 60 (see FIG. 7) sent from the supporter PC 5 and displays it on the display.

The supporter PC 5 is a computer which is installed with a mailer program 5a which creates e-mail, sends and receives email and manages e-mail transmission and reception. The mailer program 5a of the supporter PC 5 can receive a draft mail 50 (see FIG. 7) sent from the mail managing server 3 and displays it on the display. The mailer program 5a can also edit the draft mail 50, send the actual support mail 60 and perform setting for transmission of a copy mail 70 to the mail managing server 3.

The Internet 6 is a worldwide network to which multiple networks are connected and to which the teaching-material providing server 2, the mail managing server 3, the learner PCs 4 and the supporter PCs 5 are connected mutually via communication circuits. Available communication circuits are, for example, an analog telephone circuit, a digital communication circuit, such as ISDN, a cabled communication system, such as CATV (Cable Television) and a wireless communication system using communication satellites.

Figure 1B:
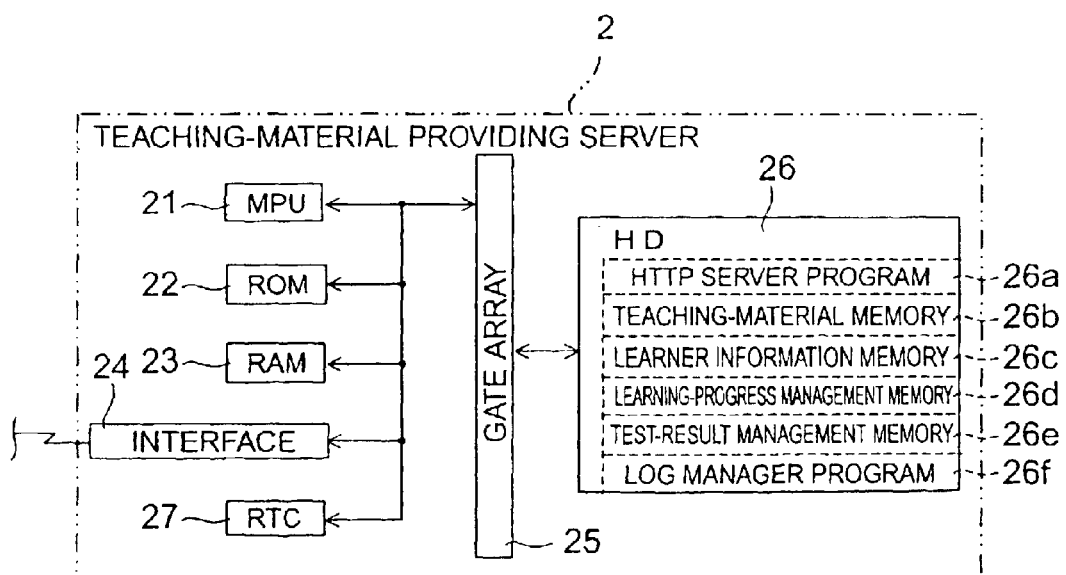
FIG. 1B is a block diagram showing the electric structure of a teaching-material providing server.

Referring now to FIGS. 1B and 2, the details of the teaching-material providing server 2 will be discussed. FIG. 1B is a block diagram showing the electric structure of the teaching-material providing server 2. As shown in FIG. 1B, the teaching-material providing server 2 is mainly provided with an MPU 21, ROM 22, RAM 23, interface 24, gate array 25, hard disk (hereinafter abbreviated as "HD") 26 and real time clock (hereinafter abbreviated as "RTC") 27. Of those components, the MPU 21, ROM 22, RAM 23, interface 24, gate array 25 and RTC 27 are mutually connected by an address bus, a data bus, control signal lines and so forth.

The MPU 21 is an arithmetic operation unit which operates based on an operating system (OS) and various application programs that are installed on the HD 26, and performs various kinds of information processing. The ROM 22 is a non-rewritable memory which stores various kinds of fixed value data in addition to a basic program that operates the MPU 21. The RAM 23 is a rewritable memory which temporarily stores various kinds of data at the time each operation of the teaching-material providing server 2 is performed and into which various kinds of programs to be supplied from the HD 26 are loaded. A program loaded into the RAM 23 is executed by the MPU 21.

The interface 24 is connected-to the Internet 6 via a communication circuit and is constituted by a modem unit, for example, in case where the communication circuit is an analog telephone circuit. The "modem unit" modulates and demodulates various kinds of communication data to be transmitted and received by the teaching-material providing server 2, transfers the modulated and demodulated data and transmits and receives various kinds of protocol signals for transfer control. The gate array 25 serves as an interface between the MPU 21 and the HD 26.

The RTC 27 is an IC which clocks the time, and specifically measures the date, such as a year, month, day and a day of a week, and the time, such as hours, minutes and seconds. The time measured by the RTC 27 is read and subjected to individual processes by the MPU 21. Particularly, a learning start date, a learning end date and a total learning time that are stored in a learning-progress management memory 26d of the HD 26 are stored in the respective areas in the learning-progress management memory 26d based on the value of the RTC 27 that is read by the MPU 21 as a log manager program 26f is executed.

The HD 26 is a large-capacity rewritable storage medium which stores the operating system (OS) of the teaching-material providing server 2 and various kinds of application programs. The large-capacity rewritable storage medium, HD 26, is provided with an HTTP server program 26a, a teaching-material memory 26b, a learner information memory 26c, the learning-progress management memory 26d, a test-result management memory 26e and the log manager program 26f.

The HTTP server program 26a is a program which controls the teaching-material providing server 2 or a WWW server in accordance with a protocol called Hyper Text Transfer Protocol (HTTP) and decodes commands sent from the mail managing server 3 and each learner PC 4. As a resulting of decoding, the teaching-material providing server 2 executes a process according to a command sent from the mail managing server 3 or each learner PC 4. "WWW" is a system to browse hypertext information on the Internet 6.

The teaching-material memory 26b is a memory which stores a plurality of lecture pages and a plurality of test question pages corresponding to the contents of the lecture pages. The lecture pages and test question pages that are stored in the teaching-material memory 26b are each constituted by a web site (information transmitting screen) of hypertext information (data) written by a makeup language, such as Hyper Text Makeup Language (HTML) and provide various lecture contents and test questions by a combination of characters, still pictures, moving pictures and voices. Lecture pages are prepared for each of a plurality of learning courses and a lecture page for each learning course is prepared for each of learning sections. A test question page contains test questions according to the lecture contents of each learning section and is prepared for each learning section.

The learner information memory 26c is a memory which stores various kinds of information about each learner. Specifically the names of learners, login names associated with the learners' names, the names of organizations to which the learners belong (e.g., company names), the names of learning courses which the learners attend, course codes corresponding to the learning course names and mail addresses of the learners or sendee addresses for e-mails to the respective learner PCs 4 are stored in the learner information memory 26c learner by learner. The login name associated with the name of each learner is a code to identify the individual learner (learner PC 4) in the teaching-material providing server 2 or the mail managing server 3.

The learning-progress management memory 26d is a memory which is provided, one for each learner, in the HD 26 and stores various kinds of information about the learning progress of the associated learner. FIG. 2A exemplifies the learning-progress management memory 26d in a conceptual diagram. Although FIG. 2A illustrates only the conceptual diagram of the learning-progress management memory 26d associated with a single learner, it is to be noted that learning-progress management memories 26d of the same structure are also provided in the HD 26 for the other learners.

As shown in FIG. 2A, the learning-progress management memory 26d is provided with a login name area 26d1, an access number area 26d2, a course code area 26d3, a section number area 26d4, a learning start date area 26d5, a learning end date area 26d6, a total learning time area 26d7 and a pages-at-end-of-learning area 26d8. The login name area 26d1 is an area for storing a login name.

The access number area 26d2 is an area for storing a number (access number) indicating the number of times access (login) has been made with a predetermined login name when login to the teaching-material providing server 2 is done with that login name. The course code area 26d3 is an area for storing the course code of a learning course which is accessed through login made by the learner PC 4 that is associated with the access number stored in the access number area 26d2. The section number area 26d4 is an area for storing the section number of the learning section that has been accessed by the learner PC 4 at the time of log-out from the access indicated by the access number. The value of the section number indicates which one of the sections of the learning course the current learning section is. For example, a section number "1" indicates the first learning section, and a section number "2" indicates the second learning section.

The learning start date area 26d5 is an area for storing the date of login to the teaching-material providing server 2 in the access indicated by each access number as the date at which learning has started. The learning end date area 26d6 is an area for storing the date of log-out from the teaching-material providing server 2 in the access indicated by each access number as the date at which learning has ended. The total learning time area 26d7 is an area for storing a total access time from the first learning start date with the login name stored in the login name area 26d1 to the learning end date corresponding to each access number (i.e., the total time of connection to the teaching-material providing server 2) as a total learning time in association with each access number. The pages-at-end-of-learning area 26d8 is an area for storing the number of pages of lecture pages that have been accessed by each learning end date. The description will now be given referring back to FIG. 1B.

The test-result management memory 26e is provided, one for each learner, in the HD 26 and stores various kinds of information about the test results of the associated learner. FIG. 2B shows a conceptual diagram of-the test-result management memory 26e. Although FIG. 2B illustrates only the conceptual diagram of the test-result management memory 26e associated with a single learner, it is to be noted that test-result management memories 26e of the same structure are also provided in the HD 26 for the other learners.

As shown in FIG. 2B, the test-result management memory 26e is provided with a login name area 26e1, an access number area 26e2, a course code area 26e3, a section number area 26e4, a correct-answer score area 26e5 and a perfect score area 26e6. The login name area 26e1 is an area for storing the login name of a learner who has accessed a test question page. The access number area 26e2 is an area for storing the access number at the time a test question page of each learning section has been accessed.

The course code area 26e3 and section number area 26e4 are areas for respectively storing the course code of a learning course and the section number of a learning section to both of which a test question page accessed with the login name stored in the login name area 26e1 belongs. The correct-answer score area 26e5 is an area for storing a score for correct answers made by the learner on the test question page that has been accessed through the login corresponding to each access number. The perfect score area 26e6 is an area for storing a perfect score on the test question page that has been accessed through the login corresponding to each access number. The description will be now given referring back to FIG. 1B.

The log manager program 26f is a program which manages the history of communication between the teaching-material providing server 2 and other units connected to the teaching-material providing server 2. Specifically, the log manager program 26f manages a history of accesses between the teaching-material providing server 2 and the learner PC 4, i.e., manages the login dates and log-out dates. The log manager program 26f manages the history of accesses made to the teaching-material providing server 2 by the learner PC 4 and the history is registered in the learning-progress management memory 26d and the test-result management memory 26e.

Referring to FIGS. 3 through 6, the details of the mail managing server 3 will be discussed. FIG. 3A is a block diagram showing the electric structure of the mail managing server 3. As shown in FIG. 3A, the mail managing server 3 is provided with an MPU 31, ROM 32, RAM 33, interface 34, gate array 35 and HD 36 and RTC 37. Of those components, the MPU 31, ROM 32, RAM 33, interface 34, gate array 35 and RTC 37 are mutually connected by an address bus, a data bus, control signal lines and so forth. Because the components 31 to 37 of the mail managing server 3 are of the same types as the components 21 to 27 of the teaching-material providing server 2, only what the components 31 to 37 differ from the components 21 to 27 of the teaching-material providing server 2 will be discussed in the following description.

The MPU 31 is an arithmetic operation unit which operates based on the mail managing program 36a stored in the HD 36. The ROM 32 is a non-rewritable memory which stores various kinds of fixed value data in addition to a basic program that operates the MPU 31. The RAM 33 is a rewritable volatile memory which temporarily stores various kinds of data to be used in various processes that are executed as the mail managing program 36a is executed. The RTC 37 is an IC of the same type as the RTC 27. The time measured by the RTC 37 is read and subjected to individual processes of the mail managing program 36a by the MPU 31. Particularly, routines in FIGS. 8 to 14 (hereinafter called "support mail distributing routines"), a part of the mail managing program 36a, are executed based on the value of the RTC 37.

The HD 36 is a large-capacity rewritable storage medium which stores the operating system (OS) of the mail managing server 3 and various kinds of application programs. The large-capacity rewritable storage medium, HD 36, is provided with a mail managing program 36a, a set information memory 36b, a learning-progress analysis reference data memory 36c, a test-result analysis reference data memory 36d, a learning-progress level conversion table 36e, a test-result level conversion table 36f, a action data memory 36g, a learning-progress status level determination table 36h, test-result status level determination table 36i, a proposed message memory 36j and a support mail memory 36k.

Figures 3A, 3B:
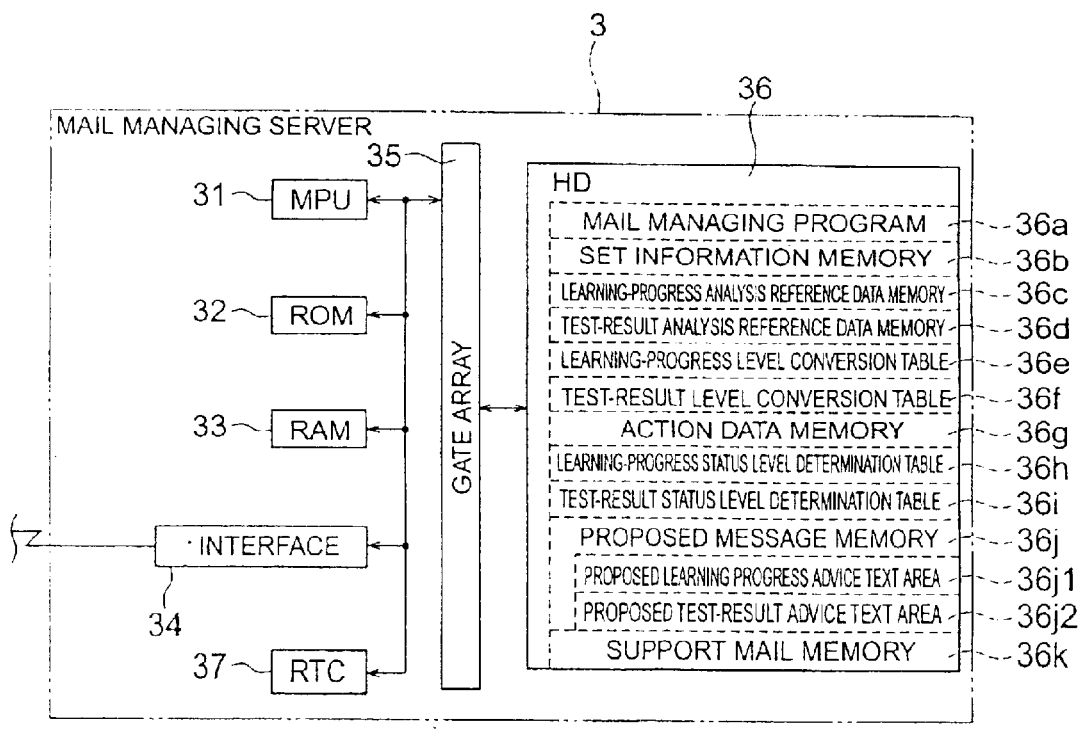
FIG. 3A is a block diagram showing the electric structure of the mail managing server.
FIG. 3B is a conceptual diagram of a set information memory.

The mail managing program 36a is a program which controls the mail managing server 3, and programs for the individual routines illustrated in flowcharts in FIGS. 8 to 14 and 16 which will be discussed later are stored as a part of the mail managing program 36a in the HD 36. The set information memory 36b is a memory for storing various kinds of set information at the time a support mail is sent to the supporter PC 5. FIG. 3B shows one example of the set information memory 36b in a conceptual diagram.

As shown in FIG. 3B, the set information memory 36b is provided with a login name area 36b1, a supporter mail address name area 36b2 and a distribution interval area 36b3. The login name area 36b1 is an area for storing a login name to identify the learner. The supporter mail address name area 36b2 is an area for storing a supporter mail address or a sendee mail address for e-mail to the supporter PC 5 that is used by the supporter of a learner associated with the login name, in association with the login name. The distribution interval area 36b3 is an area for storing the interval at which the support mail distributing routine is performed on the learner associated with the login name (hereinafter called "distribution interval"). The mail managing server 3 creates a support mail and transmits it to the supporter PC 5 by the support mail distributing routine every time the distribution interval stored in the distribution interval area 36b3 passes.

The learning-progress analysis reference data memory 36c shown in FIG. 3A is an area for analyzing various kinds of information stored in the learning-progress management memory 26d of the teaching-material providing server 2 storing various kinds of analysis data to evaluate the state of the learning progress of the learner. FIG. 4A shows one example of the learning-progress analysis reference data memory 36c in a conceptual diagram.

As shown in FIG. 4A, the learning-progress analysis reference data memory 36c is provided with a course code area 36c1, a section number area 36c2, a number-of-pages area 36c3, a standard learning time area 36c4, standard-learning-time-for-one-page area 36c5 and a target-achievement-time area 36c6. Data to be stored in each of the areas 36c4 to 36c6 of the learning-progress analysis reference data memory 36c is a learning plan scheduled for a learner converted to a numeral in case of learning a learning section of each learning course corresponding to two areas 36c1 and 36c2 of the memory 36c.

The course code area 36c1 is an area for storing the course code of a learning course. The section number area 36c2 is an area for storing the section number of a learning section. The number-of-pages area 36c3 is an area for storing the total number of pages of the lecture page and test question page that constitute a learning section indicated by each section number stored in the section number area 36c2, in association with that section number.

The standard learning time area 36c4 is an area for storing a standard predetermined time for completing a learning section indicated by the section number (hereinafter called "standard learning time"). For example, in the learning section with a section number "1" in the learning course with a course code "001", the standard learning time is 2'00 (2 hours and 00 minute).

The standard-learning-time-for-one-page area 36c5 is an area for storing a standard predetermined time for completing one page of a lecture page of a learning section indicated by the section number (hereinafter called "standard learning time for one page"). For example, in the learning section with the section number "1" in the learning course with the course code "001", the standard learning time for one page is 0'12 (0 hour and 12 minutes).

The target-achievement-time area 36c6 is an area for storing a target time for reaching a next learning section after a learning section with a given section number counting from the learning start date of a learning course (hereinafter called "target achievement time"). In the learning section with the section number "1" in the learning course with the course code "001", for example, the target achievement time is 168'00 (168 hours and 00 minute), which means that a learner should complete the learning section with the section number "1" and move to a learning section with a section number "2" before 168 hours (=24 hours×7 (or 7 days)) since the learning start date of the learning course with the course code "001".

The test-result analysis reference data memory 36d shown in FIG. 3A is a memory which analyzes various kinds of information to be stored in the test-result management memory 26e of the teaching-material providing server 2 and stores various kinds of analysis data for evaluating the test results of a learner. FIG. 4B shows one example of the test-result analysis reference data memory 36d in a conceptual diagram.

As shown in FIG. 4B, the test-result analysis reference data memory 36d is provided with a course code area 36d1 and a standard target score area 36d2. The course code area 36d1 is an area for storing the course code of a learning course. The standard target score area 36d2 is an area for storing a standard target score for correct answers that should be made in a test question page corresponding to each learning section of the learning course indicated by the course code (hereinafter called "standard target score"). The standard target score stored in the standard target score area 36d2 is data to be used to analyze the test results of a learner, and is set to "0.8" for the learning course with the course code "001" and "0.9" for the learning course with the course code "002".

The learning-progress level conversion table 36e shown in FIG. 3A is referred to in order to determine the learning progress level based on each of the values of an achievement points stored in a previous section achievement point area 36g3 and a current section achievement point area 36g4 of the action data memory 36g to be discussed later. FIG. 4C shows one example of the learning-progress level conversion table 36e in a conceptual diagram.

As shown in FIG. 4C, the learning-progress level conversion table 36e is provided with a learning progress level area 36e1, a previous section achievement point reference area 36e2 and a current section achievement point reference area 36e3. The learning progress level area 36e1 is an area for storing a learning progress level for evaluating the degree of the learning progress in six levels in a period from the first learning start date of one learning course (hereinafter called "first learning start date") to the date of execution of the support mail distributing routine (hereinafter called "distribution date"). The previous section achievement point reference area 36e2 is an area for storing the range of the previous section achievement point according to each section of the learning progress level area 36e1. The current section achievement point reference area 36e3 is an area for storing the range of the current section achievement point according to each section of the learning progress level area 36e1.

According to the learning-progress level conversion table 36e, the learning progress level is set in such a way that as the values of the previous section achievement point and the current section achievement point become larger, i.e., as the learning progress becomes faster, the learning progress level becomes higher from level b1 to level b2, level b3, level b4, level b5 and level b6 in order and when the learning progress speed is as scheduled in the learning plan, the learning progress level becomes level b3. The previous section achievement point and the current section achievement point are points (evaluation points) that indicate the degree of the learning progress.

Specifically, the current section achievement point is the total progress time (hereinafter called "current total progress time") since the first learning start date of one learning course to the distribution date at the present time (hereinafter called "current distribution date"), divided by a target achievement time corresponding to the section number of one learning section (hereinafter called "current section number") which the learner is studying at the time of the current distribution date. (This target achievement time will be hereinafter called "current section target achievement time".) The previous section achievement point is the current total progress time divided by a target achievement time corresponding to the section number of a learning section previous by one (hereinafter called "previous section number") to the learning section which the learner is studying at the time of the current distribution date. (This target achievement time will be hereinafter called "previous section target achievement time".)

In case of a learner with a login name "AAA01", for example, the first learning start date is "2000/7/1 9:00" as shown in FIG. 2A, so that if "2000/9/9 9:00", 70 days after, is the current distribution date, the current total progress time becomes 1680 hours. The current section number at the current distribution date is "7". Referring to FIG. 4A, the current section target achievement time is 1896 hours and the previous section target achievement time is 1512 hours. As a result, the value of the previous section achievement point is 1.110 (≈1680 hours÷1512 hours) and the value of the current section achievement point is 0.886 (≈1680 hours÷1896 hours) (see FIG. 5).

The test-result level conversion table 36$f$ shown in FIG. 3A is referred to in order to determine a short-term grade level and a cumulative grade level from individual grade points stored in a short-term grade point area 36$g$5 and a cumulative grade point area 36$g$6 of the action data memory 36$g$ to be discussed later. FIG. 4D shows one example of the test-result level conversion table 36$f$ in a conceptual diagram.

As shown in FIG. 4D, the test-result level conversion table 36$f$ is provided with a grade level area 36$f$1 and a grade point reference area 36$f$2. The grade level area 36$f$1 is an area for storing a test-result level for evaluating, in six levels, the results of a test using a test question page which is performed for each learning section. The grade point reference area 36$f$2 is an area for storing the range of grade points corresponding to the individual sections of the grade level area 36$f$1.

When the support mail distributing routine illustrated in the flowcharts in FIGS. 8 to 14 is carried out, the grade point reference area 36$f$2 of the test-result level conversion table 36$f$ in the mail managing server 3 is referred to, it is determined to which sections of the grade point reference area 36$f$2 the actual short-term grade point and the cumulative grade point correspond, and the grade levels stored in the associated sections of the grade level area 36$f$1 corresponding to the determined sections of the grade point reference area 36$f$2 are determined as the short-term grade level and the cumulative grade level. The short-term grade level and the cumulative grade level are determined individually.

In the test-result level conversion table 36$f$, the grade level is set in such a way that as the value of the short-term grade point or the cumulative grade point becomes larger, i.e., as the test results become better, the short-term grade level or the cumulative grade level becomes higher from level c1 to level c2, level c3, level c4, level c5 and level c6 in order and when the test results are substantially equal to the standard target score, the short-term grade level and the cumulative grade level become level c4.

The short-term grade point is a point (evaluation point) which indicates the results of one test or two or more tests given using the test question page within a period from a previous distribution date at which the support mail distributing routine (hereinafter referred to as "previous distribution date") was executed to the current distribution date. Specifically, for one test or two or more tests given within a period from a previous distribution date to the current distribution date, the short-term grade point is what is attained by further dividing a value obtained by dividing the sum of the points on the correct answers in the entire tests by the sum of the perfect points by the standard target score for the learning course to which the learning section belongs.

The cumulative grade point is a point which indicates the results of one test or two or more tests given using the test question page within a period from the first learning start date to the current distribution date. Specifically, for one test or two or more tests given within a period from the first learning start date to the current distribution date, the cumulative grade point is what is attained by further dividing a value obtained by dividing the sum of the points on the correct answers in the entire tests by the sum of the perfect points by the standard target score for the learning course.

Referring to FIG. 2A, for the learner with the login name "AAA01", for example, the first learning start date is "2000/7/1 9:00" and if "2000/9/9 9:00", 70 days after, is the current distribution date, the previous distribution date becomes "2000/9/2 9:00". In this case, referring to FIGS. 2A and 2B, a test for the sixth learning section has been given at the previous distribution date and the current distribution date and the score for the correct answers to the test for the sixth learning section is "95" and the perfect score is "100".

As the standard target score for the learning section "001" is "0.8", the short-term grade point becomes "1.19 (=95÷100÷0.8)". As a value obtained by dividing the sum of the scores for the correct answers to the test for the first to sixth sections done from the first learning start date to the current distribution date, "494 (=70+85+90+73+81+95)", by the sum of the perfect scores, "600", is further divided by a standard target score "0.8" corresponding to the course code "001", the cumulative grade point becomes "1.03 (=496÷600÷0.8)".

The action data memory 36$g$ shown in FIG. 3A is a memory for mainly storing the learning progress level, the short-term grade level and cumulative grade level in association with each distribution date starting at the first learning start date. FIG. 5 shows one example of the action data memory 36$g$ in a conceptual diagram. Although FIG. 5 illustrates only the conceptual diagram of the action data memory 36$g$ associated with a single learner, it is to be noted that action data memories 36$g$ of the same structure are also provided in the HD 36 for the other learners.

As shown in FIG. 5, the action data memory 36$g$ is provided with a login name area 36$g$1, a distribution date area 36$g$2, the previous section achievement point area 36$g$3, the current section achievement point area 36$g$4, the short-term grade point area 36$g$5, the cumulative grade point area 36$g$6, a learning progress level area 36$g$7, a short-term grade level area 36$g$8 and a cumulative grade level area 36$g$9.

The login name area 36g1 is an area for storing a login name used by a learner, and the distribution date area 36g2 is an area for storing the date at which the support mail distributing routine has been executed. The mail managing server 3 executes the support mail distributing routine when the distribution interval stored in the distribution interval area 36b3 of the set information memory 36b elapses since a latest date stored in the distribution date area 36g2. The date at which the support mail distributing routine has been executed is written as the latest date in the distribution date area 36g2.

Note that the first support mail distributing routine is carried out when the distribution interval stored in the distribution interval area 36b3 of the set information memory 36b elapses since the first learning start date stored in the learning start date area 26d5 of the learning-progress management memory 26d. The individual areas 36g3 to 36g9 of the action data memory 36g respectively store data according to the sections of the distribution date area 36g2, i.e., those areas store various kinds of data which are determined every time the support mail distributing routine is executed, in association with the distribution date of the support mail distributing routine. Specifically, the previous section achievement point area 36g3 is an area for storing the aforementioned previous section achievement point, the current section achievement point area 36g4 is an area for storing the aforementioned current section achievement point, the short-term grade point area 36g5 is an area for storing the aforementioned short-term grade point and the cumulative grade point area 36g6 is an area for storing the aforementioned cumulative grade point.

The learning progress level area 36g7 is an area for storing one of levels b1 to b6 of the learning progress level which is determined by referring to the learning-progress level conversion table 36e. The short-term grade level area 36g8 is an area for storing one of levels c1 to c6 of the short-term grade level which is determined by referring to the test-result level conversion table 36f. The cumulative grade level area 36g9 is an area for storing one of levels c1 to c6 of the cumulative grade level which is determined by referring to the test-result level conversion table 36f.

The learning-progress status level determination table 36h shown in FIG. 3A is referred to in order to determine the value of the learning-progress status level from the learning progress level that has been determined at the current distribution date (hereinafter called "current learning progress level") and the learning progress level that has been determined at the previous distribution date (hereinafter called "previous learning progress level"). Here, the learning-progress status level value is data for evaluating the learning progress status in a period from the first learning start date to the current distribution date in comparison with the learning progress status in a period from the first learning start date to the previous distribution date. FIG. 6 shows one example of the learning-progress status level determination table 36h.

As shown in FIG. 6A, integer values which take one of values "-1" to "-5" are stored in the learning-progress status level determination table 36h as learning-progress status level values in accordance with the sections of the previous learning progress level and the current learning progress level. Referring to the learning-progress status level determination table 36h, for example, the learning-progress status level value is determined as "0", when the previous learning progress level matches with the previous learning progress level, the learning-progress status level value is determined as one of values "-1" to "-5" when the current learning progress level is lower than the previous learning progress level, and the learning-progress status level value is determined as one of values "1" to "5" when the current learning progress level is higher than the previous learning progress level.

When the learning-progress status level value is less than "0", it means that the learning progress status at the current distribution date has become poorer than the learning progress status at the previous distribution date. As the learning-progress status level value further becomes smaller in order from "-1" toward "-5", it means that the learning progress status at the current distribution date has become poorer significantly than the learning progress status at the previous distribution date. When the learning-progress status level value is "0", it means that the learning progress status at the current distribution date has not changed from the learning progress status at the previous distribution date. When the learning-progress status level value exceeds "0", it means that the learning progress status at the current distribution date has been improved from the learning progress status at the previous distribution date. As the learning-progress status level value further becomes greater in order from "1" toward "5", it means that the learning progress status at the current distribution date has been improved significantly as compared with the learning progress status at the previous distribution date.

The test-result status level determination table 36i is referred to in order to determine the short-term grade status level value and the cumulative grade status level value from the short-term grade level value and cumulative grade level that have been determined at the current distribution date and the short-term grade level value and cumulative grade level that have been determined at the previous distribution date. In the following description, the short-term grade level value that has been determined at the current distribution date is called "current short-term grade level", the cumulative grade level that has been determined at the current distribution date is called "current cumulative grade level", the short-term grade level value that has been determined at the previous distribution date is called "previous short-term grade level" and the cumulative grade level that has been determined at the previous distribution date is called "previous cumulative grade level".

The short-term grade status level value is data for evaluation of the results of a test given in a period from the previous distribution date to the current distribution date in comparison with the results of a test given in a period from two distribution dates before (one distribution date before the previous distribution date) to the previous distribution date. The cumulative grade status level value is data for evaluation of the results of all the tests given within a period from the first learning start date to the current distribution date in comparison with the results of all the tests given within a period from the first learning start date to the previous distribution date. FIG. 6B shows one example of the test-result status level determination table 36i in a conceptual diagram.

As shown in FIG. 6B, integer values which take one of values "-1" to "-5" are stored in the test-result status level determination table 36i in accordance with the sections of the previous grade level and the current grade level as test-result status level values. Here, the test-result status level value stored in the test-result status level determination table 36i corresponds to the short-term grade status level value and cumulative grade status level value, the previous grade level corresponds to the previous short-term grade level and previous cumulative grade level, and the current grade level corresponds to the current short-term grade level and current cumulative grade level.

Referring to the test-result status level determination table 36i, for example, the test-result status level value is determined as "0" when the previous grade level matches with the current grade level, the test-result status level value is determined as one of values "−1" to "−5" when the current grade level is lower than the previous grade level, and the test-result status level value is determined as one of values "1" to "5" when the current grade level is higher than the previous grade level.

When the test-result status level value is less than "0", it means that the test results associated with the current distribution date have become poorer than the test results associated with the previous distribution date. As the test-result status level value further becomes smaller in order from "−1" toward "−5", it means that the test results associated with the current distribution date have become poorer significantly than the test results associated with the previous distribution date. When the test-result status level value is "0", it means that the test results associated with the current distribution date have not changed from the test results associated with the previous distribution date. When the learning-progress status level value exceeds "0", it means that the test results associated with the current distribution date have been improved from the test results associated with the previous distribution date. As the learning-progress status level value further becomes greater in order from "1" toward "5", it means that the test results associated with the current distribution date have been improved significantly as compared with the test results associated with the previous distribution date.

Returning to FIG. 3A, a further description will be given. The proposed message memory 36j is a memory for storing various kinds of advice on the learning progress status and test results of the learner at the time the support mail distributing routine is executed. The proposed message memory 36j mainly has a proposed learning progress advice text area 36j1 and a proposed test-result advice text area 36j2.

The proposed learning progress advice text area 36j1 is an area for storing a proposed learning progress advice text corresponding to each learning-progress status level value determined referring to the learning-progress status level determination table 36h. The proposed learning progress advice text stored in the proposed learning progress advice text area 36j1 is text data including advice or a message which is to be sent to the learner from the supporter in association with the learning progress status of the learner at the current distribution date and differs according to the learning-progress status level value.

In case where the learning-progress status level value is less than "0", for example, the proposed learning progress advice text has such contents as to spur the learner to improve the learning progress status and to increase the motivation of the learner to study as the learning-progress status level value becomes smaller in order from "−1" toward "−5". In case where the learning-progress status level value is "0", the proposed learning progress advice text has such contents as to encourage the learner to further improve the learning progress status. In case where the learning-progress status level value is greater than "0", the proposed learning progress advice text has such contents as to encourage or praise the learner to further improve the learning progress status or to maintain the current status and to increase the motivation to study as the learning-progress status level value becomes greater in order from "1" toward "5".

The proposed test-result advice text area 36j2 is an area for storing a proposed short-term grade advice text corresponding to the short-term grade status level value determined referring to the test-result status level determination table 36i and a proposed cumulative grade advice text corresponding to the cumulative grade status level value determined likewise referring to the test-result status level determination table 36i in association with those short-term grade status level value and cumulative grade status level value. The proposed short-term grade advice text and proposed cumulative grade advice text stored in the proposed test-result advice text area 36j2 are both text data including advice or a message which is to be sent to the learner from the supporter in association with the test results.

The proposed short-term grade advice text is concerned with the results of all the tests given within a period from the previous distribution date to the current distribution date and its contents vary according to the short-term grade status level value. The proposed cumulative grade advice text is concerned with the results of all the tests given within a period from the first learning start date to the current distribution date and its contents vary according to the cumulative grade status level value.

In case where the two types of test-result status level values are less than "0", the proposed advice text has such contents as to spur the learner to improve the test results and to increase the motivation of the learner to study as the test-result status level value becomes smaller in order from "−1" toward "−5". In case where the test-result status level value is "0", the proposed advice text has such contents as to encourage the learner to further improve the test results. In case where the test-result status level value is greater than "0", the proposed advice text has such contents as to encourage or praise the learner to further improve the test results or to maintain the current status and to increase the motivation to study as the test-result status level value becomes greater in order from "1" toward "5".

The support mail memory 36k is a memory for storing a support mail sent to a supporter mail address from the mail managing server 3 (draft mail 50 to be discussed later) or a copy of the support mail actually sent to a learner mail address from the supporter PC 5 (copy mail 70 to be discussed later), classified for the login name of each learner. FIG. 7 shows a conceptual diagram of the support mail transmitting/receiving routine.

As shown in FIG. 7, a draft of a support mail (hereinafter called "draft mail") 50 prepared by the mail managing server 3 is transmitted to the supporter mail address from the mail managing server 3 and is received at the supporter PC 5. The draft mail 50 has header data 51, which includes sendee data 51a, sender data 51b and title data 51c, and body data 52 which includes support message data 52a of a support message addressed to the learner.

The sendee data 51a of the header data 51 is the supporter mail address or the sendee mail address for the draft mail 50, and the sender data 51b is the mail address of the sender of the draft mail 50, i.e., the e-mail address of the mail managing server 3. The title data 51c is a title text briefly indicating the contents of the draft mail 50 and is given in a predetermined format by the mail managing program 36a.

The support message data 52a of the body data 52 is mostly data in which an "address" written with the name of a learner, such as "Mr. Taro Maruyama", "season's greetings", "proposed learning progress advice text" in which comments or advice on the learning progress status is written, "proposed test-result advice text" in which comments or advice on the test results is written, and "closing statement" which closes the support message are written in order.

The mail managing server 3 sends the draft mail 50 to the supporter mail address of the sendee data 51*a*. When the supporter PC 5 receives the draft mail 50, the supporter confirms the support message data 52*a* of the body data 52 of the draft mail 50 using the supporter PC 5. The supporter PC 5 creates a support mail actually sent to the learner mail address (hereinafter called "actual support mail") 60 based on the draft mail 50 through the manipulation by the supporter. Written in the actual support mail 60 are a learner mail address as sendee address data 61*a* of body data 61, a supporter mail address as sender data 61*b*, a title text similar to or different from the title data 51*c* as title data 61*c* and the e-mail address of the mail managing server 3 as bcc (blind carbon copy) sendee data 61*d*.

The bcc sendee data 61*d* is an e-mail address where a copy 70 of the e-mail (actual support mail 60) which is to be sent to the e-mail address indicated by the sendee data (learner mail address) is transmitted. (The copy will hereinafter be called "copy mail".) The e-mail address designated by the bcc sendee data is not shown on another actual support mail 60 which has been sent to another sendee (learner mail address).

When the supporter PC 5 executes transmission of the actual support mail 60, the actual support mail 60 is sent to the learner mail address and the copy mail 70 of the actual support mail 60 is sent to the e-mail address of the mail managing server 3. The actual support mail 60 and the copy mail 70 are identical in the contents of support message data 62*a* and 72*a* of their both body data 62 and 72, i.e., their message contents are identical. As the copy mail 70 is stored in the support mail memory 36*k* of the mail managing server 3 through a copy mail reception routine illustrated in FIG. 14, therefore, the support message having the same contents as those of the actual support mail 60 actually sent to the learner PC 4 can be stored in the mail managing server 3.

Figure 8:
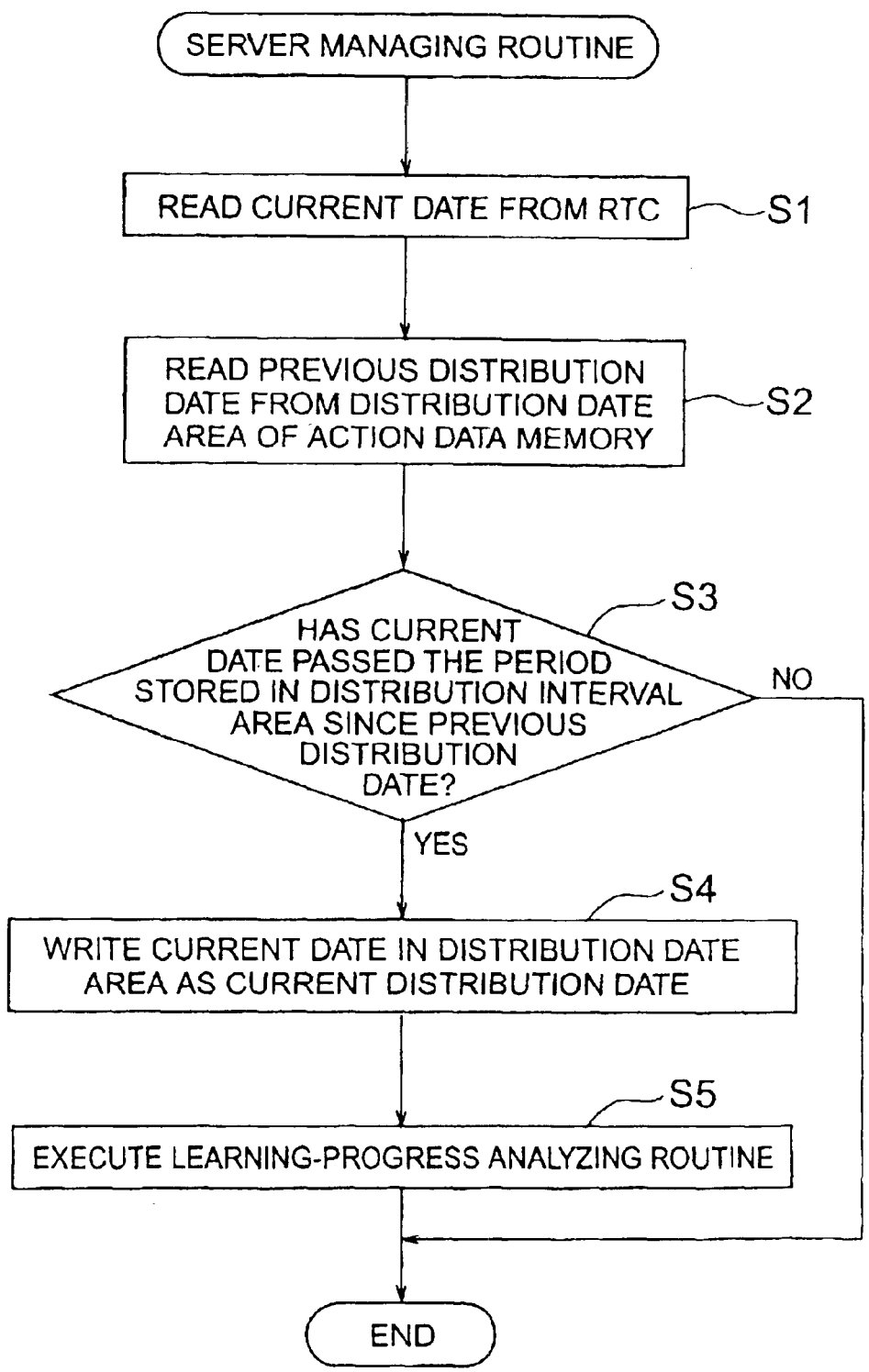
FIG. 8 is a flowchart illustrating a server managing routine.

Referring now to FIGS. 8 and 16, the operation of the remote learning network system 1 constructed in the above-described manner will be described. FIGS. 8 to 14 are flowcharts illustrating routines from a routine of editing a support mail addressed to a learner in place of a supporter to a routine of transmitting the support mail. FIG. 16 is a flowchart illustrating a request mail responding routine which is associated with e-mail in which various types of requests to be sent from the supporter PC 5 is written (the e-mail will be hereinafter called "request mail"). The support mail distributing routine illustrated in the flowcharts in FIGS. 8 to 14 is a sequence of routines ending with transmission of a support mail addressed to one learner. In case of sending support mails to a plurality of learners, the support mail distributing routine in FIGS. 8 to 14 has only to be executed for each learner.

Figure 9:
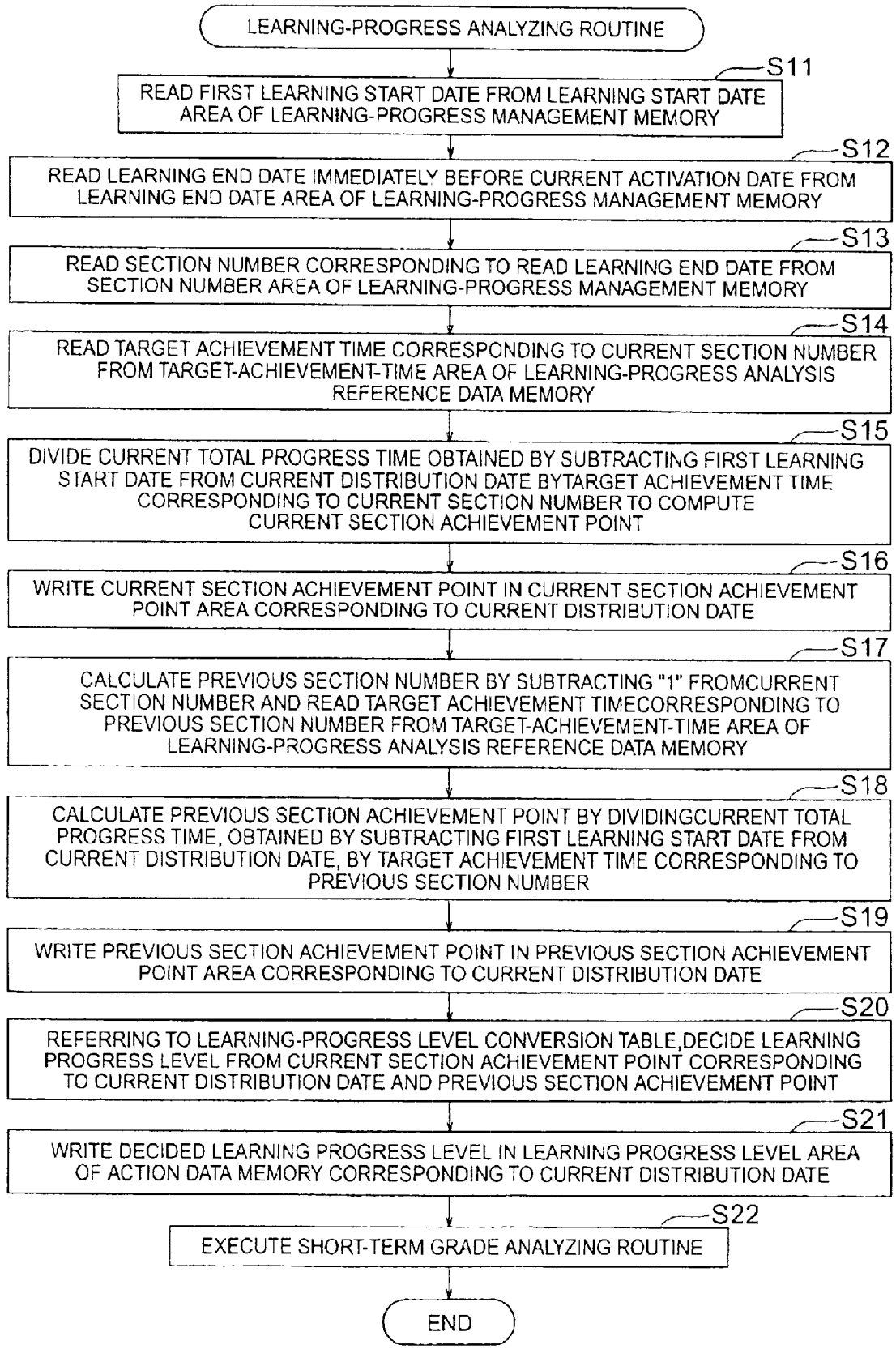
FIG. 9 is a flowchart illustrating a learning-progress analyzing routine.
Figure 14:
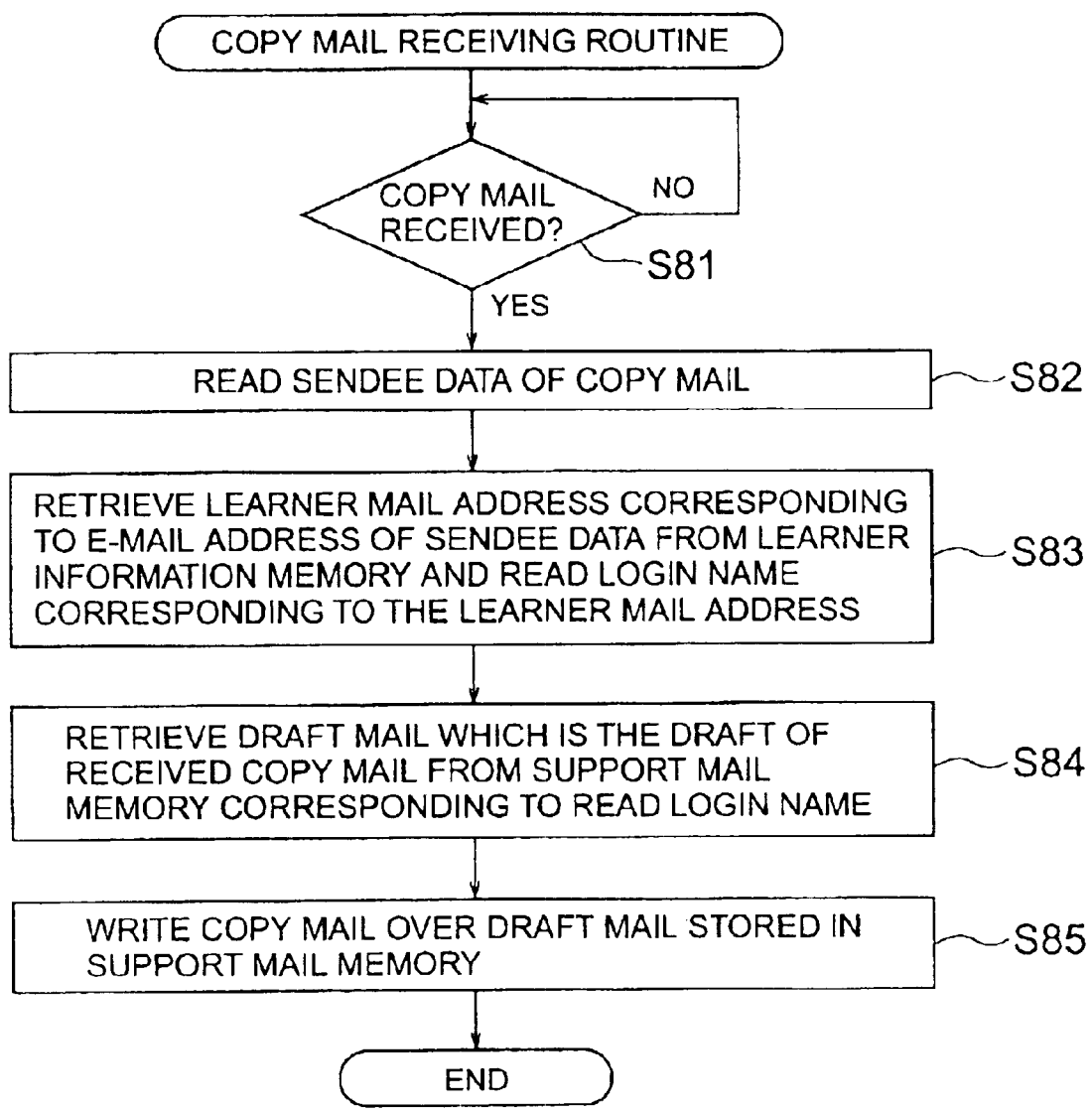
FIG. 14 is a flowchart illustrating a copy mail receiving routine.

FIG. 8 is the flowchart illustrating a server managing routine which determines whether the routines from the learning-progress analyzing routine in FIG. 9 to a copy mail receiving routine in FIG. 14 are to be executed or not. In the server managing routine, first, the current date is read from the RTC 37 (S1), and the previous distribution date corresponding to a predetermined login name is read from the distribution date area 36*g*2 of the action data memory 36*g* (S2). The previous distribution date corresponds to the latest one of distribution dates stored in the distribution date area 36*g*2.

If the current date read in the process of S1 has passed the period that is stored in the distribution interval area 36*b*3 of the set information memory 36*b* since the previous distribution date read in the process of S2 (Yes in S3), the current date read in S1 is written in the distribution date area 36*g*2 of the action data memory 36*g* as the current distribution date (S4), and the execution of the learning-progress analyzing routine is instructed (S5) after which the routine is terminated. If the current date read in the process of S1 has not passed the period stored in the distribution interval area 36*b*3 of the set information memory 36*b* since the previous distribution date read in the process of S2 (No in S3), on the other hand, the processes of S4 and S5 are skipped and the server managing routine for one learner is terminated.

FIG. 9 is the flowchart illustrating the learning-progress analyzing routine. In the learning-progress analyzing routine, first, the first learning start date is read from the learning start date area 26*d*5 of the learning-progress management memory 26*d* in the teaching-material providing server 2 (S11), and a learning end date immediately before the current activation date stored in the distribution date area 36*g*2 of the action data memory 36*g* is read from the learning end date area 26*d*6 of the learning-progress management memory 26*d* in the teaching-material providing server 2 (S12). After this reading, a section number corresponding to the learning end date read in the process of S12 is read from the section number area 26*d*4 of the learning-progress management memory 26*d* (S13). The section number read out in the process of S13 indicates a learning section which is being studied at the point of the current distribution date.

Next, a target achievement time corresponding to the section number (current section number) read out in the process of S13 is read from the target-achievement-time area 36*c*6 of the learning-progress analysis reference data memory 36*c* (S14). The first learning start date read in the process of S11 is subtracted from the current distribution date read in the process of S12 to acquire a current total progress time from the first learning start date to the current distribution date, and the current total progress time is divided by the target achievement time read in the process of S14 to compute a current section achievement point (S15). Further, the computed current section achievement point is written in the current section achievement point area 36*g*4 in association with the current activation date that is stored in the distribution date area 36*g*2 of the action data memory 36*g* (S16).

After calculation of the current section achievement point, the previous section achievement point is calculated. A value obtained by subtracting "1" from the value of the current section number read in the process of S13 corresponds to the section number of a learning section previous by one to the learning section which is being studied at the point of the current distribution date (previous section number). Taking the value obtained by subtracting "1" from the value of the current section number read in the process of S13 as the previous section number, therefore, the target achievement time corresponding to the previous section number is read from the target-achievement-time area 36*c*6 of the learning-progress analysis reference data memory 36*c* (S17). Furthermore, the current total progress time obtained in S15 is divided by the target achievement time read in the process of S17 to compute a previous section achievement point (S18) and the previous section achievement point is written in the previous section achievement point area 36*g*3 in association with the current activation date stored in the distribution date area 36*g*2 of the action data memory 36*g* (S19).

Thereafter, referring to the learning-progress level conversion table 36*e*, that section of the current section achievement point reference area 36e3 to which the current section achievement point calculated in the process of S15 and that section of the previous section achievement point reference area 36e2 to which the previous section achievement point calculated in the process of S18 are determined to decide the learning progress level corresponding to the current distribution date (S20). After the learning progress level is decided, the learning progress level is written in the learning progress level area 36g7 of the action data memory 36g which corresponds to the current distribution date (S21) and the execution of the next short-term grade analyzing routine is instructed (S22) after which the learning-progress analyzing routine is terminated.

Figure 10:
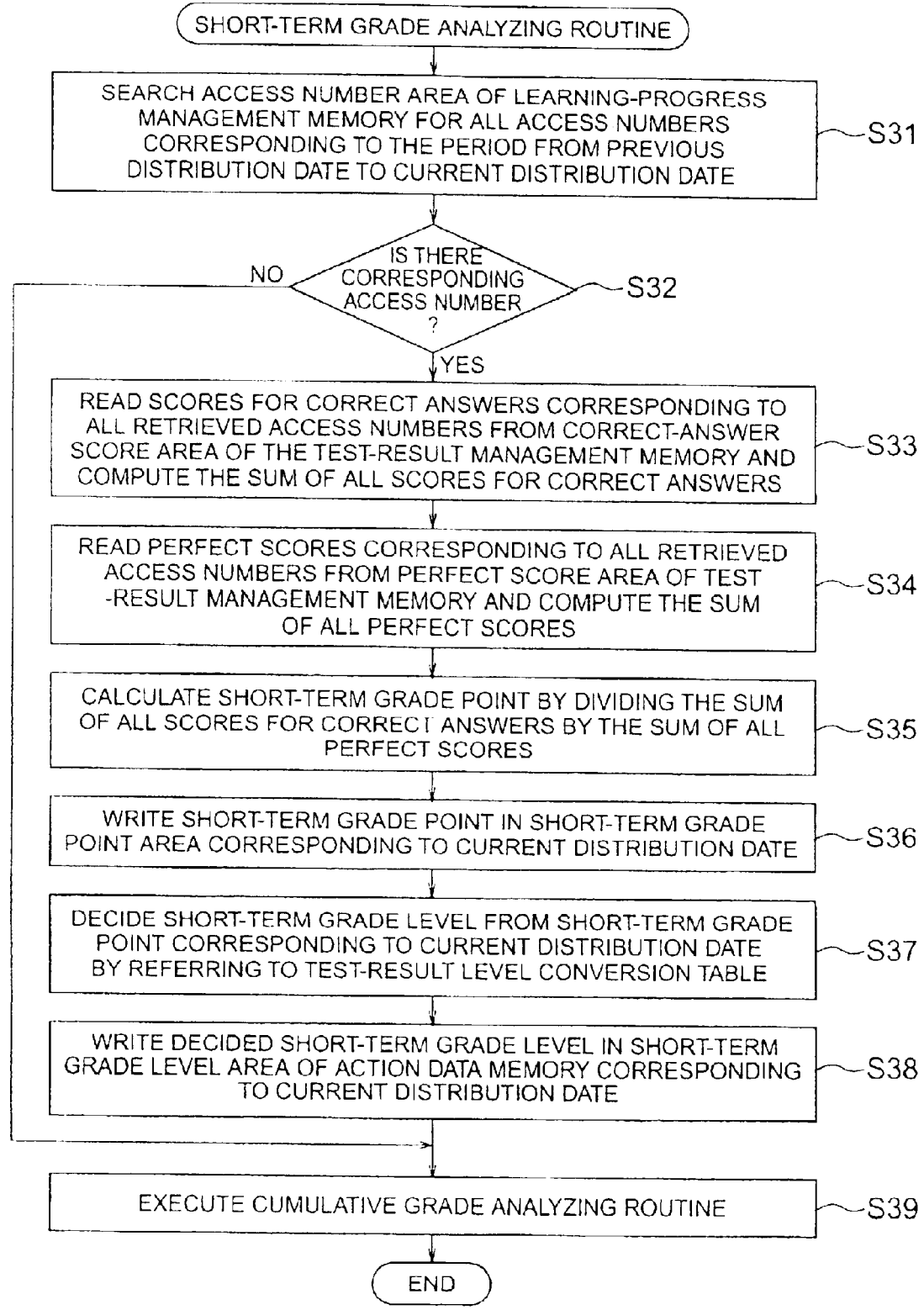
FIG. 10 is a flowchart illustrating a short-term grade analyzing routine.

FIG. 10 is the flowchart illustrating the short-term grade analyzing routine. In the short-term grade analyzing routine, the previous distribution date and the current distribution date stored in the distribution date area 36g2 of the action data memory 36g are compared with the learning end date stored in the learning end date area 26d6 of the learning-progress management memory 26d of the teaching-material providing server 2 to search the access number area 26d2 of the learning-progress management memory 26d for all the access numbers that correspond to the period from the previous distribution date to the current distribution date (S31). In case where there is no corresponding access number (No in S32), which means that no tests have been given within the period from the previous distribution date to the current distribution date, the routine goes to S39 to instruct the execution of the cumulative grade analyzing routine (S39) after which the short-term grade analyzing routine is terminated.

In case where there is any corresponding access number (Yes in S32), on the other hand, the scores for the correct answers corresponding to all the access numbers retrieved in the process of S31 are read from the correct-answer score area 26e5 of the test-result management memory 26e and the sum of all the read scores for the correct answers is computed (S33). Further, the perfect scores corresponding to all the access numbers retrieved in the process of S31 are read from the perfect score area 26e6 of the test-result management memory 26e and the sum of all the read perfect scores is computed (S34).

The sum of all the read scores for the correct answers calculated in the process of S33 is divided by the sum of all the read perfect scores calculated in the process of S34 to calculate a short-term grade point (S35), and the calculated short-term grade point is written in the short-term grade point area 36g5 in association with the current distribution date stored in the distribution date area 36g2 of the action data memory 36g (S36).

After the short-term grade point is calculated in S35, that section of the grade point reference area 36f2 to which the short-term grade point corresponds is determined referring to the test-result level conversion table 36f and the grade level stored in the grade level area 36f1 corresponding to that section is decided as the short-term grade level corresponding to the current distribution date (S37). After the short-term grade level is decided, the short-term grade level is written in the short-term grade level area 36g8 of the action data memory 36g corresponding to the current distribution date (S38) and the execution of the next cumulative grade analyzing routine is instructed (S39) after which the short-term grade analyzing routine is terminated.

Figure 11:
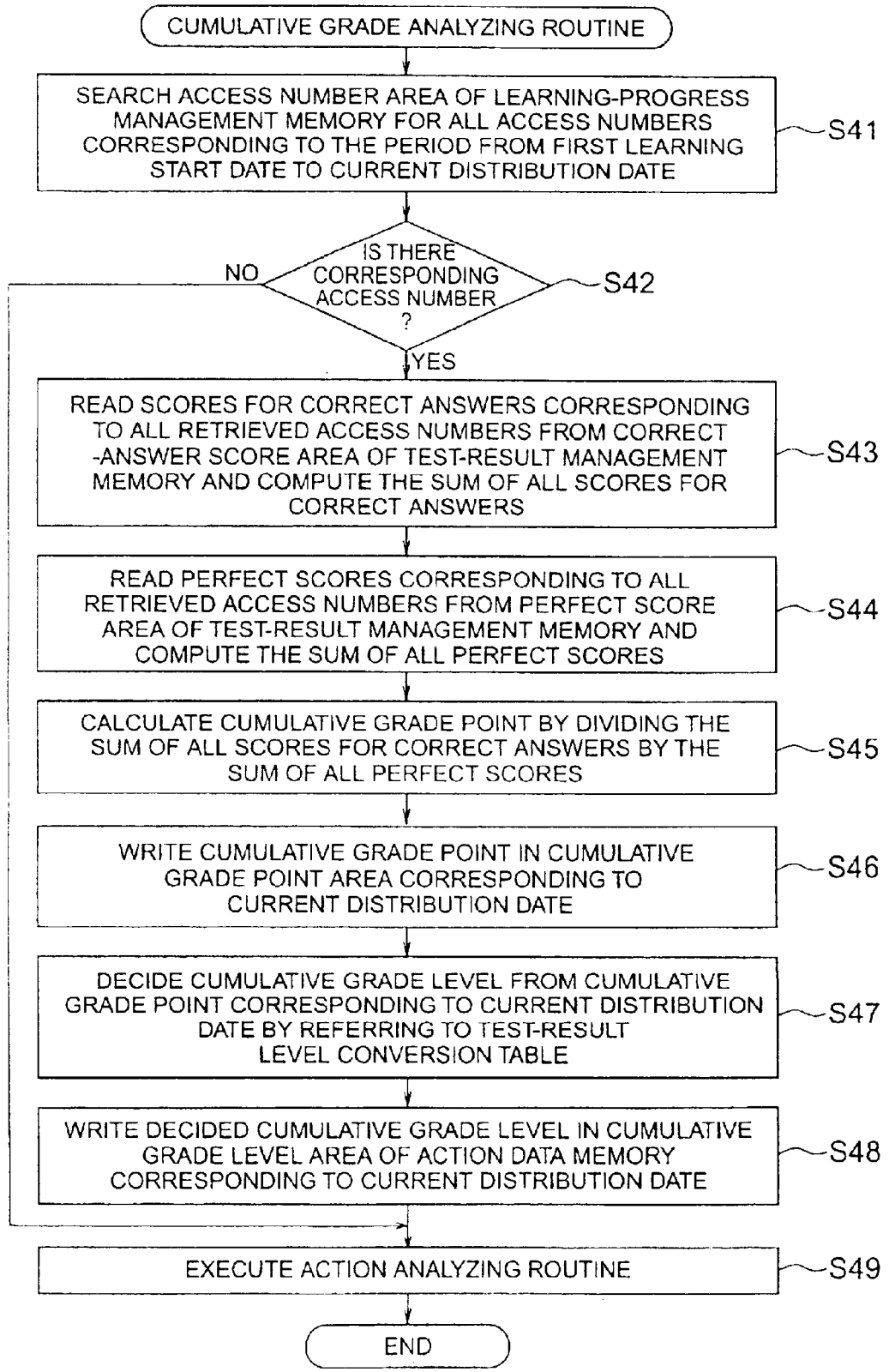
FIG. 11 is a flowchart illustrating a cumulative grade analyzing routine.

FIG. 11 is the flowchart illustrating the cumulative grade analyzing routine. In the cumulative grade analyzing routine, the current distribution date stored in the distribution date area 36g2 of the action data memory 36g is compared with the learning end date stored in the learning end date area 26d6 of the learning-progress management memory 26d of the teaching-material providing server 2 to search the access number area 26d2 of the learning-progress management memory 26d for all the access numbers that correspond to the period from the first learning start date to the current distribution date (S41). In case where there is no corresponding access number (No in S42), which means that no tests have been given within the period from the first learning start date to the current distribution date, the routine moves to S49 to instruct the execution of the next action analyzing routine (S49) after which the cumulative grade analyzing routine is terminated.

In case where there is any corresponding access number (Yes in S42), on the other hand, the scores for the correct answers corresponding to all the access numbers retrieved in the process of S41 are read from the correct-answer score area 26e5 of the test-result management memory 26e and the sum of all the read scores for the correct answers is computed (S43). Further, the perfect scores corresponding to all the access numbers retrieved in the process of S41 are read from the perfect score area 26e6 of the test-result management memory 26e and the sum of all the read perfect scores is computed (S44).

The sum of all the read scores for the correct answers calculated in the process of S43 is divided by the sum of all the read perfect scores calculated in the process of S44 to calculate a cumulative grade point (S45), and the calculated cumulative grade point is written in the cumulative grade point area 36g6 in association with the current distribution date stored in the distribution date area 36g2 of the action data memory 36g (S46).

After the cumulative grade point is calculated in S45, that section of the grade point reference area 36f2 to which the cumulative grade point corresponds is determined referring to the test-result level conversion table 36f and the grade level stored in the grade level area 36f1 corresponding to that section is decided as the cumulative grade level corresponding to the current distribution date (S47). After the cumulative grade level is decided, the cumulative grade level is written in the cumulative grade level area 36g9 of the action data memory 36g corresponding to the current distribution date (S48) and the execution of the next action analyzing routine is instructed (S49) after which the cumulative grade analyzing routine is terminated.

Figure 12:
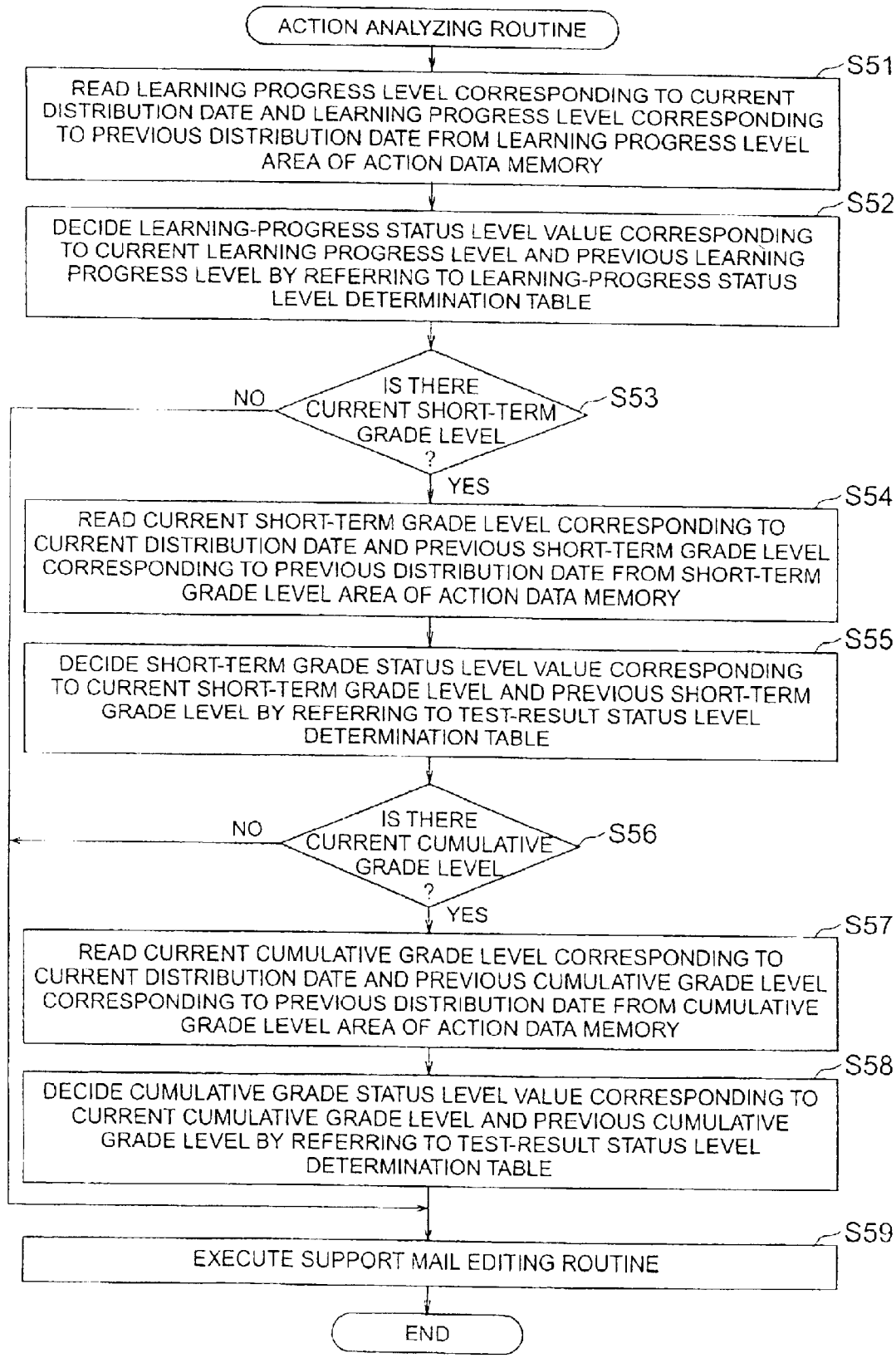
FIG. 12 is a flowchart illustrating an action analyzing routine.

FIG. 12 is the flowchart illustrating the action analyzing routine. In the action analyzing routine, first, the learning progress level corresponding to the current distribution date and the learning progress level corresponding to the previous distribution date are read from the learning progress level area 36g 7 of the action data memory 36g (S51), and the learning-progress status level value corresponding to the current learning progress level and the previous learning progress level is decided by referring to the learning-progress status level determination table 36h (S52). Next, it is determined whether the current short-term grade level corresponding to the current distribution date is stored in the short-term grade level area 36g8 of the action data memory 36g or not (S53). In case where the current short-term grade level is not stored (No in S53), the routine goes to S59 without calculating the short-term grade level and the execution of the next support mail editing/sending routine is instructed (S59) after which the action analyzing routine is terminated.

If the current short-term grade level corresponding to the current distribution date is stored in the short-term grade level area 36g8 of the action data memory 36g (Yes in S53), on the other hand, the current short-term grade level and the previous short-term grade level corresponding to the previous distribution date are read from the short-term grade level area 36g8 of the action data memory 36g (S54). After this process, the short-term grade status level value corresponding to the current short-term grade level and the previous short-term grade level is decided by referring to the test-result status level determination table 36i (S55). After the process in S55, it is determined whether or not the current cumulative grade level corresponding to the current distribution date is stored in the cumulative grade level area 36g9 of the action data memory 36g (S56). In case where the current cumulative grade level is not stored (No in S56), the routine goes to S59 without calculating the cumulative grade level and the execution of the next support mail editing/sending routine is instructed (S59) after which the action analyzing routine is terminated.

If the current cumulative grade level corresponding to the current distribution date is stored in the cumulative grade level area 36g9 of the action data memory 36g (Yes in S56), on the other hand, the current cumulative grade level and the previous cumulative grade level corresponding to the previous distribution date are read from the cumulative grade level area 36g9 of the action data memory 36g (S57). After this process, the cumulative grade status level value corresponding to the current cumulative grade level and the previous cumulative grade level is decided by referring to the test-result status level determination table 36i (S58) and the execution of the next support mail editing/sending routine is instructed (S59) after which the action analyzing routine is terminated.

Naturally, the learning-progress status level value, the short-term grade status level value and the cumulative grade status level value that have been decided in the above-described routine are temporarily stored in the RAM 33. In the processes of S54 and S57, when data on the short-term grade level and the cumulative grade level are not stored in the short-term grade level area 36g8 and the cumulative grade level area 36g9 corresponding to the previous distribution date, the short-term grade level and the cumulative grade level which correspond to the latest one of distribution dates excluding the current distribution date are read from the short-term grade level area 36g8 and cumulative grade level area 36g9 as the short-term grade level and the cumulative grade level which correspond to the previous distribution date.

Figure 13:
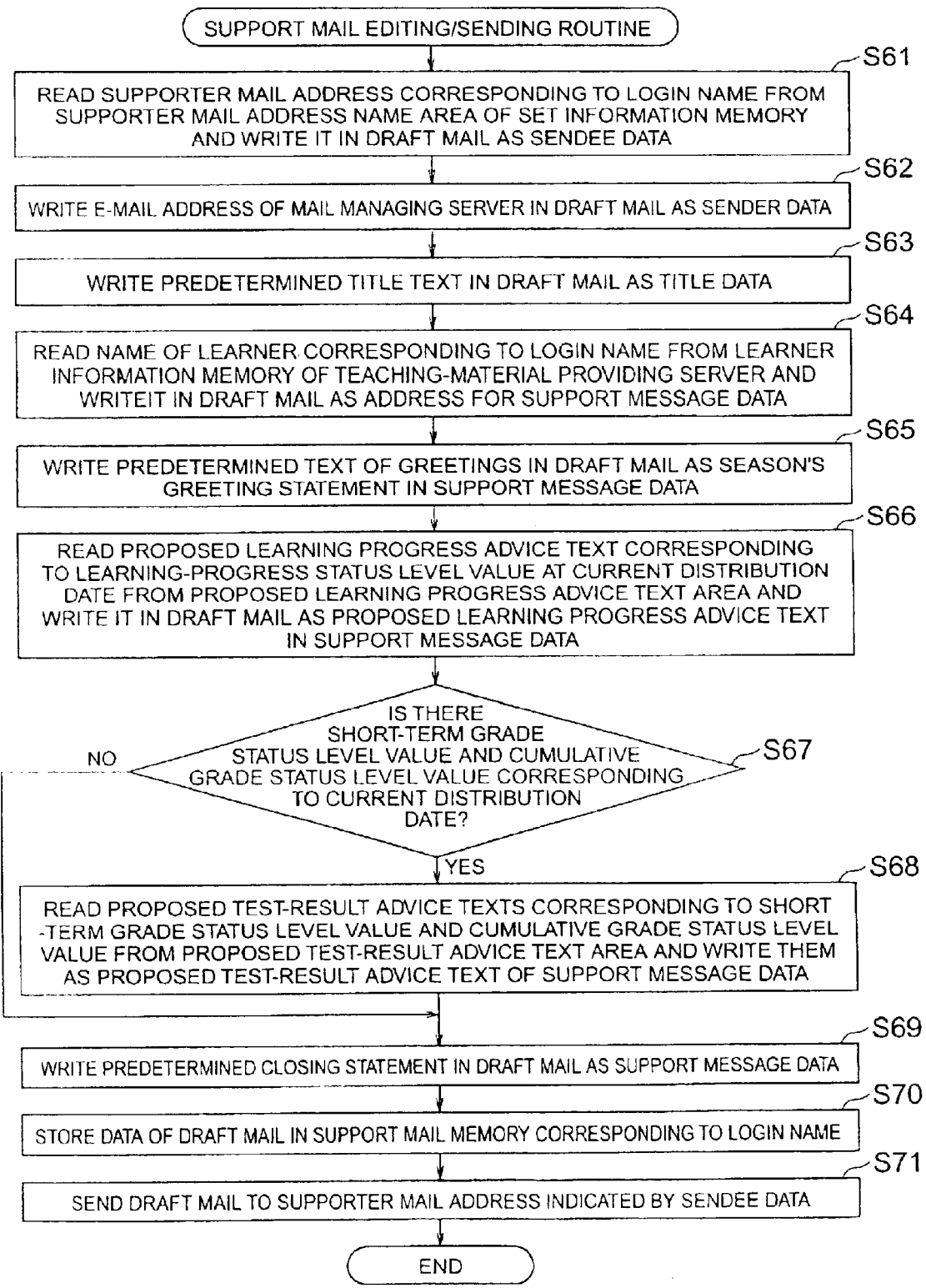
FIG. 13 is a flowchart illustrating a support mail editing/sending routine.

FIG. 13 is the flowchart illustrating the support mail editing/sending routine. In the support mail editing/sending routine, first, for the learner whose learning-progress status level value, short-term grade status level value and cumulative grade status level value have been computed in the sequence of routines in FIGS. 8 to 12, the supporter mail address corresponding to the login name of that learner is read from the supporter mail address name area 36b2 of the set information memory 36b and is written in the draft mail 50 as the sendee data 51a (S61).

After the e-mail address of the mail managing server 3 is written in the draft mail 50 as the sender data 51b (S62), a predetermined title text is written in the draft mail 50 as the title data 51c (S63). It is to be noted that the e-mail address of the mail managing server 3 is stored in part of the HD 36. The title text that is written in the sendee data 51a of the draft mail 50 is, for example, the name of the learner and the current activation date described therein so that the supporter can easily identify the mail as the draft mail 50 from the mail managing server 3.

Next, the name of the learner corresponding to the login name is read from the learner information memory 26c of the teaching-material providing server 2 and written in the draft mail 50 as the address for the support message data 52a (S64), and a predetermined text of greetings is written in the draft mail 50 as the season's greetings in the support message data 52a (S65). In case where the address is written in the support message data 52a in the process of S64, an honorific title, such as "Mr." may be additionally written after the name of the learner. A plurality of greeting texts according to the seasons are stored in part of the proposed message memory 36j and a proper one is written in the draft mail 50 based on the current distribution date.

Further, a proposed learning progress advice text corresponding to the learning-progress status level value at the current distribution date is read from the proposed learning progress advice text area 36j1 of the proposed message memory 36j and written in the draft mail 50 as the proposed learning progress advice text in the support message data 52a (S66). Next, it is determined whether the short-term grade status level value and cumulative grade status level value which correspond to the current distribution date have been calculated or not (S67). In case where the short-term grade status level value and cumulative grade status level value are stored in the RAM 33 (Yes in S67), proposed test-result advice texts which respectively correspond to those status level values are read from the proposed test-result advice text area 36j2 of the proposed message memory 36j and written as proposed test-result advice text associated with the short-term grade status and cumulative grade status of the support message data 52a (S68).

Then, a predetermined closing statement is written in the draft mail 50 as closing words of the support message data 52a (S69), after which data of the draft mail 50 is stored in the support mail memory 36k corresponding to the login name (S70). The draft mail 50 is then transmitted to the supporter mail address indicated by the sendee data 51a (S71) after which the support mail editing/sending routine is terminated. If the short-term grade status level value and cumulative grade status level value are stored in the RAM 33 in the process of S67 (No in S67), the process of S68 is skipped not to write the proposed test-result advice text in the draft mail 50 and the processes in and following S69 are executed. The closing statement is stored in part of the proposed message memory 36j.

FIG. 14 is the flowchart illustrating the copy mail receiving routine. The copy mail receiving routine is for receiving the copy mail 70 sent from the supporter PC 5 at the mail managing server 3. In the copy mail receiving routine, first, the mail managing server 3 determines whether the copy mail 70 has been received or not (S81) and stands by until the copy mail 70 is received (No in S81). When the copy mail 70 is received (Yes in S81), sendee data 71a of header data 71 of the copy mail 70 is read (S82). Then, a learner mail address which corresponds to the e-mail address of the sendee data 71a is retrieved from the learner information memory 26c of the teaching-material providing server 2 and the login name that corresponds to the retrieved learner mail address is read from the learner information memory 26c (S83).

Then, the draft mail 50 which is the draft of the copy mail 70 received in the process of S81 is retrieved from the support mail memory 36k corresponding to the read login name (S84). The copy mail 70 is written over the retrieved draft mail 50 (S85) after which the copy mail receiving routine is terminated.

In case where the copy mail 70 is not received from the supporter PC 5 (No in S81), the draft mail 50 stored in the support mail memory 36k by the process of S70 in FIG. 13 is held as it is.

As apparent from the above, when the copy mail 70 is received (Yes in S81), writing the copy mail 70 over the draft mail 50 can allow the mail managing server 3 to generally control the contents of the support mail actually sent to the learner from the supporter. What is more, as the transmission date identical to the one in the body data 61 of the actual support mail 60 is written in the header data 71 of the copy mail 70, overwriting the copy mail 70 in the support mail memory 36k can allow the mail managing server 3 to generally control the transmission date of the actual support mail 60 too.

Figure 15:
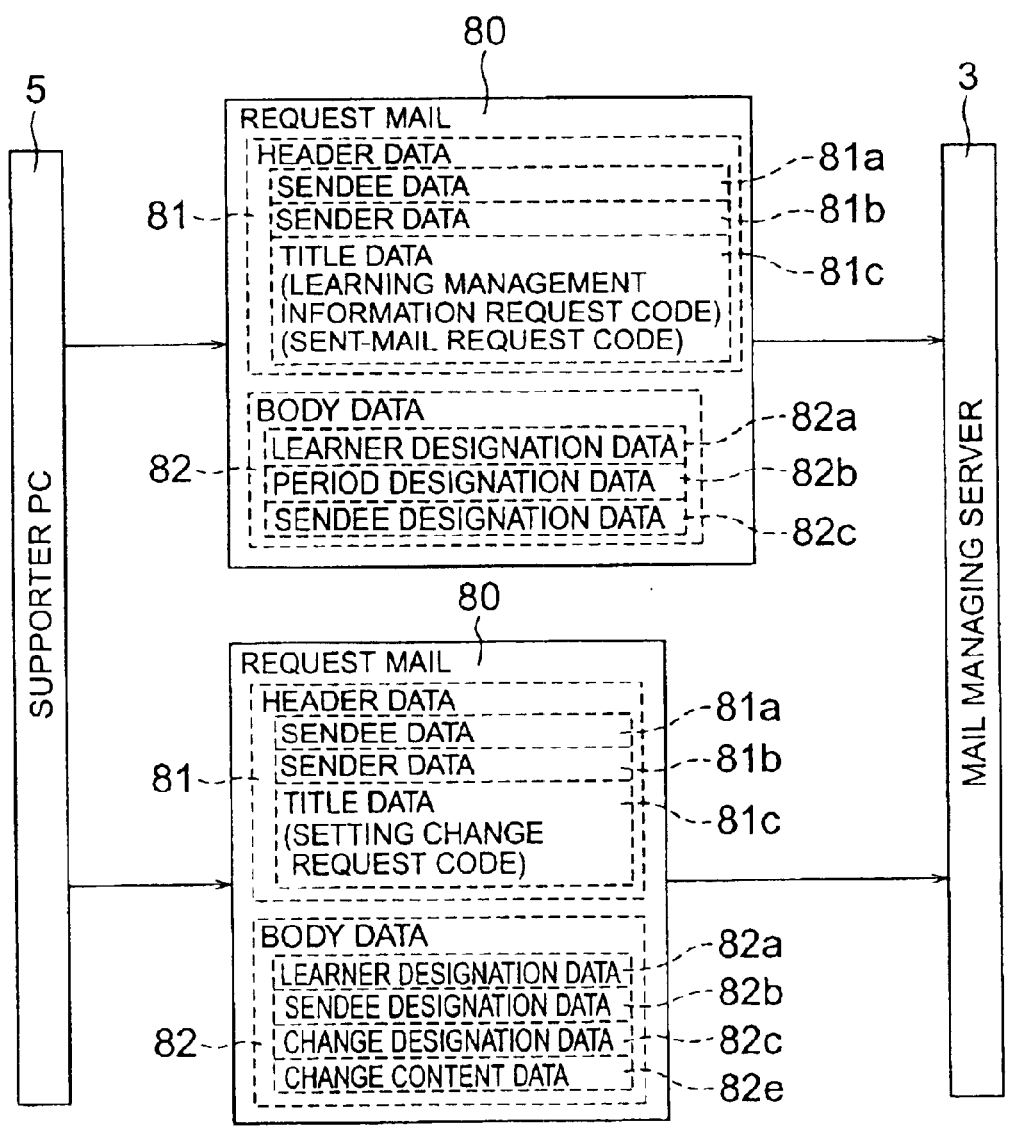
FIG. 15 is a conceptual diagram of a request mail transmitting routine.

FIG. 15 is the conceptual diagram of the request mail transmitting routine. As shown in FIG. 15, a request mail 80 is e-mail which is sent to the e-mail address of the mail managing server 3 from the supporter PC 5 and includes header data 81, which has sendee data 81a, sender data 81b and title data 81c, and body data 82, which has learner designation data 82a, period designation data 82b and sendee designation data 82c. In case where the title data 81c is a setting change request code, the period designation data 82b does not exist in the body data 82 of the request mail 80 but change designation data 82d and change content data 82e are added.

The sendee data 81a of the header data 81 is the e-mail address of the mail managing server 3 while the sender data 81b is the sender mail address of the request mail 80, e.g., the supporter mail address. The title data 81c is a request code indicating what the request mail 80 requests of the mail managing server 3, such as a learning management information request code, sent-mail request code or setting change request code. The learning management information request code is a code requesting the mail managing server 3 to browse various kinds of information stored in the learning-progress management memory 26d and test-result management memory 26e, the sent-mail request code is a code requesting the mail managing server 3 to browse e-mail stored in the support mail memory 36k and the setting change request code is a code requesting the mail managing server 3 to change or add various kinds of information stored in the set information memory 36b.

The learner designation data 82a of the body data 82 indicates whether or not the response process of the contents indicated by the request code of the title data 81c is to be performed for which learner, and is the name of a learner, for example. The period designation data 82b indicates the period of information whose browsing is requested when the title data 81c is a learning management information request code or sent-mail request code. If the period designation data 82b is given as "2000/7/2 to 2000/8/2", for example, it is possible to request browsing of information that was stored in the learning-progress management memory 26d and test-result management memory 26e between Jul. 2, 2000 and Aug. 2, 2000 or browsing of e-mail that were stored in the support mail memory 36k between Jul. 2, 2000 and Aug. 2, 2000.

The sendee designation data 82c is an e-mail address which is the sendee for a response mail to the request mail 80 (hereinafter called "sendee main address"). The response mail is e-mail in which information whose browsing has been requested is written in its body data when the title data 81c is the learning management information request code or the sent-mail request code and is e-mail in which data before alteration and data after alteration are written in its body data when the title data 81c is the setting change request code.

The change designation data 82d designates data whose setting is requested to change when the title data 81c is the setting change request code. In case where the change designation data 82d is an address change code, for example, it requests alteration of a supporter mail address to be stored in the supporter mail address name area 36b2 of the set information memory 36b. In case where the change designation data 82d is a distribution interval change code, it requests alteration of a distribution interval to be stored in the distribution interval area 36b3 of the set information memory 36b.

The change content data 82e is the contents after changing data whose alteration is requested by the change designation data 82d. In case where the change designation data 82d is the address change code, for example, the change content data 82e is a supporter mail address after alteration and in case where the change designation data 82d is the distribution interval change code, the change content data 82e is the number of days indicating the distribution interval after alteration.

FIG. 16 is the flowchart illustrating the request mail responding routine. In the request mail responding routine, first, the mail managing server 3 stands by until reception of the request mail 80 (No in S91). When the request mail 80 is received (Yes in S91), the request code of the title data 81c of the request mail 80 is read out. When the title data 81c is the learning management information request code (LEARNING MANAGEMENT INFORMATION REQUEST CODE in S92), the learner designation data 82a, the period designation data 82b and the sendee designation data 82c are read from the body data 82 of the request mail 80 (S93) and the login name that corresponds to the learner designation data 82a is retrieved from the learner information memory 26c (S94). Based on the retrieved login name, data which corresponds to the period designated by the period designation data 82b is extracted from data stored in the learning-progress management memory 26d and test-result management memory 26e that correspond to the login name, and is written in the body data of the response mail (S95).

When the title data 81c is the sent-mail request code (SENT-MAIL REQUEST CODE in S92), the learner designation data 82a, the period designation data 82b and the sendee designation data 82c are read from the body data 82 of the request mail 80 (S96) and the login name that corresponds to the learner designation data 82a is retrieved from the learner information memory 26c (S97). Based on the retrieved login name, what was stored in the support mail memory 36k in the period designated by the period designation data 82b is read from e-mail stored in the support mail memory 36k that corresponds to the login name, and is written in the body data of the response mail (S98).

When the title data 81c is the setting change request code (SETTING CHANGE REQUEST CODE in S92), the learner designation data 82a, the sendee designation data 82c, the change designation data 82d and the change content data 82e are read from the body data 82 of the request mail 80 (S99) and the login name that corresponds to the learner designation data 82a is retrieved from the learner information memory 26c (S100).

When the change designation data 82d is the address change code (ADDRESS CHANGE CODE in S101), data of the supporter mail address name area 36b2 corresponding to the login name retrieved in the process of S100 is rewritten with the supporter mail address of the change content data 82e (S102). Further, the rewritten supporter mail address is read from the supporter mail address name area 36b2 and is written, together with the supporter mail address before rewriting, in the body data of the response mail (S103). The supporter mail address before rewriting is temporarily stored and retained in the RAM 33 beforehand prior to the process of S102.

When the change designation data 82d is the distribution interval change code (DISTRIBUTION INTERVAL CHANGE CODE in S101), data of the distribution interval area 36b3 corresponding to the login name retrieved in the process of S100 is rewritten with the number of days of the distribution interval of the change content data 82e (S104). Further, the rewritten distribution interval is read from the distribution interval area 36b3 and is written in the body data of the response mail (S105). The supporter mail address before rewriting is temporarily stored and retained in the RAM 33 beforehand prior to the process of S105. Thereafter, the processes of S95, S98, S103 and S105 are executed, then the response mail is transmitted to the e-mail address of the sendee designation data 82c of the request mail 80 (S106) after which the request mail responding routine is terminated.

In the embodiment, each data stored in the learning-progress management memory 26d and test-result management memory 26e corresponds to the learning information recited in the appending claim 1, the processes of S11 and S12 in FIG. 9, the processes of S31 to S34 in FIG. 10 and the processes of S41 to S44 in FIG. 11 correspond to the learning information reading means, the processes of S13 to S15, S17, S18 and S20 in FIG. 9, the processes of S35 and S37 in FIG. 10 and the processes of S45 and S47 in FIG. 11 correspond to the analysis means, the action analyzing routine in FIG. 12 corresponds to the learning situation determining means, the processes of S66 and S68 in FIG. 13 correspond to the message reading means, and the process of S71 in FIG. 13 corresponds to the message transmitting means. The process of S3 in FIG. 8 corresponds to the time passage determining means as recited in the appending claim 2, and the process of S5 in FIG. 8 corresponds to the learning information readout executing means.

Although the foregoing description of the invention has been given of the preferred embodiment, the invention is not limited to the embodiment but may be readily modified in various forms within the scope and spirit of the invention. For example, although the mail managing server 3 and the teaching-material providing server 2 are provided separately in the embodiment, the functions of the mail managing server may be installed in the teaching-material providing server. In case where the individual status level values that are respectively decided in the processes of S52, S55 and S58 in FIG. 12 are equal to the individual status level values that were decided at previous distribution date, the subsequent processes may be executed, taking values obtained by subtracting "1" from the status level values actually decided in the processes of S52, S55 and S58 in FIG. 12 as the current status level values. This can prevent support messages with the same contents from being transmitted at the previous distribution date and the current distribution date and can lead to an improvement of the motivation of the learner to study.

According to the learning support message distribution program as recited in claim 1, learning information of a learner can be analyzed based on analysis data, a change in the learning situation of the learner can be determined by comparing the analysis result data with old analysis result data, and a support message whose contents correspond to the result of the determination can be read out and transmitted to the sendee address of the supporter unit. Therefore, the support message that should be prepared by the supporter can be created by the program in cooperation of a computer in place of the supporter and is transmitted to the supporter unit. This can bring about such an advantage as to be able to reduce the burden imposed on the supporter in creating a support message.

What is more, when the supporter unit receives the support message sent to the sendee address, the supporter can give proper advice to the learner based on the support message, thereby ensuring adequate communication between the supporter and the learner in accordance with the learning situation. This can bring about such an advantage as to prevent the learner from losing the learning will or giving up learning.

The learning support message distribution program as recited in claim 2 has such an advantage that the learning information readout executing means allows the learning information reading means to read information at every predetermined time interval in addition to the advantages of the learning support message distribution program as recited in claim 1. It is therefore possible to regularly transmit a support message in accordance with the learning situation of the learner. This provides such an advantage that the supporter can regularly acquire the support message for the learner and can give detailed advice based on the support message to the learner.

It should be apparent to those skilled in the art that the present invention may be embodied in many other specific forms without departing from the spirit or scope of the invention.

Therefore, the present examples and embodiments are to be considered as illustrative and not restrictive and the invention is not to be limited to the details given herein, but may be modified within the scope and equivalence of the appended claims.

What is claimed is:

1. A learning support message distribution program allowing a computer having learning information memory means for storing learning information of a learner and address memory means, connected to a supporter unit to be used by a supporter of said learner, for storing sendee address for communication data to said supporter unit to function as:

learning information reading means for reading learning information from said learning information memory means;

analysis data memory means for storing analysis data for analyzing said learning information read from said learning information reading means;

analysis means for analyzing said learning information read by said learning information reading means based on said analysis data stored in said analysis data memory means;

analysis result data memory means for storing said analysis result data obtained by said analysis means;

learning situation determining means for determining a change in a learning situation by comparing old analysis result data stored in said analysis result data memory means with current analysis result data obtained by said analysis means;

message memory means for storing a support message whose contents correspond to a result of determination made by said learning situation determining means;

message reading means for reading said support message corresponding to said result of determination made by said learning situation determining means from said message memory means; and message transmitting means for transmitting said support message read by said message reading means to said sendee address stored in said address memory means.

2. The learning support message distribution program according to claim 1, which further allows said computer to function as:

clock means for measuring time;

time interval memory means for storing information on a time interval from information readout performed by said learning information reading means to next information readout;

time passage determining means for determining a passage of said time interval stored in said time interval memory means based on said time measured by said clock means; and learning information readout executing means for causing said learning information reading means to execute a readout process when said time passage determining means determines that said time interval stored in said time interval memory means has passed.

* * * * *